US009888277B2

(12) United States Patent
Yeom et al.

(10) Patent No.: US 9,888,277 B2
(45) Date of Patent: Feb. 6, 2018

(54) CONTENT PLAYBACK METHOD AND ELECTRONIC DEVICE IMPLEMENTING THE SAME

(71) Applicant: Samsung Electronics Co., Ltd., Suwon-si, Gyeonggi-do (KR)

(72) Inventors: Donghyun Yeom, Bucheon-si (KR); Hyunsoo Kim, Yongin-si (KR); Yongjoon Jeon, Hwaseong-si (KR); Geonsoo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/698,107

(22) Filed: Apr. 28, 2015

(65) Prior Publication Data

US 2015/0333951 A1 Nov. 19, 2015

(30) Foreign Application Priority Data

May 19, 2014 (KR) ........................ 10-2014-0059856

(51) Int. Cl.

*H04N 21/2662* (2011.01)
*H04L 29/08* (2006.01)

(Continued)

(52) U.S. Cl.

CPC ... *H04N 21/2662* (2013.01); *H04L 29/08954* (2013.01); *H04L 67/10* (2013.01);

(Continued)

(58) Field of Classification Search

CPC ... H04L 29/08954; H04L 67/10; H04L 67/16; H04N 21/2343; H04N 21/23805; H04N 21/2387; H04N 21/25891; H04N 21/2402; H04N 21/2662; H04N 21/440281; H04N 21/44217; H04N 21/6373; H04N 21/6587; H04N 21/23439; H04N 21/47217; H04N 21/8456; H04N 21/234381; H04N 21/26216; H04N 7/17318; H04N 21/23655; H04N 21/2383; H04N 21/2393; H04N 21/44209; H04N 21/6377;

(Continued)

(56) References Cited

U.S. PATENT DOCUMENTS 8,407,747 B1 3/2013 Inskip et al.
8,782,727 B1 * 7/2014 Nagarajan ........... H04L 43/0888 725/115

(Continued)

FOREIGN PATENT DOCUMENTS

KR 10-1243737 B1 3/2013
KR 10-2013-0063413 A 6/2013

(Continued)

*Primary Examiner* — Benjamin R Bruckart
*Assistant Examiner* — Tien M Nguyen
(74) *Attorney, Agent, or Firm* — Jefferson IP Law, LLP

(57) ABSTRACT

A method for managing a playback of contents in an electronic device is provided. The method includes recognizing a major section of the contents, obtaining at least one of setup information related a network speed, data remaining amount and playback, and playback time of the contents, and deciding a playback policy of the contents based on at least one of the recognized major section and the obtained information.

5 Claims, 20 Drawing Sheets

(51) Int. Cl.

| | |
|---|---|
| ***H04N 7/173*** | (2011.01) |
| ***H04N 21/2343*** | (2011.01) |
| ***H04N 21/4402*** | (2011.01) |
| ***H04N 21/238*** | (2011.01) |
| ***H04N 21/2387*** | (2011.01) |
| ***H04N 21/24*** | (2011.01) |
| ***H04N 21/262*** | (2011.01) |
| ***H04N 21/442*** | (2011.01) |
| ***H04N 21/258*** | (2011.01) |
| ***H04N 21/472*** | (2011.01) |
| ***H04N 21/6373*** | (2011.01) |
| ***H04N 21/6587*** | (2011.01) |
| ***H04N 21/845*** | (2011.01) |

(52) U.S. Cl.

CPC ......... *H04L 67/16* (2013.01); *H04N 7/17318* (2013.01); *H04N 21/2387* (2013.01); *H04N 21/23439* (2013.01); *H04N 21/23805* (2013.01); *H04N 21/234381* (2013.01); *H04N 21/2402* (2013.01); *H04N 21/25891* (2013.01); *H04N 21/26216* (2013.01); *H04N 21/44209* (2013.01); *H04N 21/440281* (2013.01); *H04N 21/47217* (2013.01); *H04N 21/6373* (2013.01); *H04N 21/6587* (2013.01); *H04N 21/8456* (2013.01)

(58) Field of Classification Search

CPC ............... H04N 21/64769; H04N 5/76; H04N 21/21805; H04N 21/23418; H04N 21/251; H04N 21/25825; H04N 21/25833; G06F 17/30787; G06F 17/30796; G06F 17/30802; G06F 17/30811; G06F 17/30843; G06K 9/00711

See application file for complete search history.

(56) References Cited

U.S. PATENT DOCUMENTS

| | | | | |
|---|---|---|---|---|
| 2003/0217091 | A1* | 11/2003 | Echigo .................... | H04L 29/06 718/103 |
| 2004/0125877 | A1* | 7/2004 | Chang ............... | G06F 17/30787 375/240.28 |
| 2010/0050202 | A1* | 2/2010 | Kandekar ......... | G06F 17/30244 725/14 |
| 2012/0072611 | A1 | 3/2012 | Kandekar et al. | |
| 2014/0149562 | A1* | 5/2014 | Xiao ................... | H04L 41/0879 709/222 |
| 2015/0012928 | A1* | 1/2015 | Chen ................ | H04N 21/25866 725/14 |
| 2015/0039721 | A1 | 2/2015 | Jung et al. | |

FOREIGN PATENT DOCUMENTS

| | | | | |
|---|---|---|---|---|
| KR | 10-2013-0088234 A | | 8/2013 | |
| WO | WO 0207164 A2 | * | 1/2002 | ....... G06F 17/30787 |

* cited by examiner

CONTENT PLAYBACK METHOD AND ELECTRONIC DEVICE IMPLEMENTING THE SAME

CROSS-REFERENCE TO RELATED APPLICATION(S)

This application claims the benefit under 35 U.S.C. § 119(a) of a Korean patent application filed on May 19, 2014 in the Korean Intellectual Property Office and assigned Serial number 10-2014-0059856, the entire disclosure of which is hereby incorporated by reference.

TECHNICAL FIELD

The present disclosure relates to a method for playing contents back by selectively adjusting a playback quality and a playback section of the contents, and an electronic device implementing the same.

BACKGROUND

Electronic devices such as a smartphone and a tablet personal computer (PC) can play contents back by downloading from another device through a network. The contents may be played back in a high resolution if a network condition is good, and played back in a low resolution if the network condition is poor. However, the resolution of contents can be decided according to a user selection regardless of the network condition.

A method for playing contents back according to the prior art doesn't distinguish a major section and a non-major section of the contents, and thereby can generate problems in network quality, data consumption, and playback time, regardless of user intention.

When a network's speed doesn't satisfy the minimum requirement for playing contents back due to a poor network condition, inconveniences are generated due to a break phenomenon in the playback. For example, a user could not watch a playback of major section because the major section is not downloaded in time.

Data consumptions of the major section and non-major section are identical, and data consumption charges also become identical. Most of users make a data charge plan in a limited capacity. Therefore, handling of the major section and non-major section in the same way may generate inefficiency in term of cost.

Further, handling of the major section and non-major section in the same way may generate inefficiency in term of time.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above mentioned problems and/or disadvantages and to provide at least the advantages described below. Accordingly, an aspect of the present disclosure is to provide a method for preferentially playing a major section of contents back and an electronic device implementing the same.

Another aspect of the present disclosure is to provide a method for efficiently playing contents back in term of cost. Further, another aspect of the present disclosure is to provide a method for efficiently playing contents back in term of time.

In accordance with an aspect of the present disclosure, a method for managing a playback of contents in an electronic device is provided. The method includes recognizing a major section of the contents, obtaining at least one of setup information related to a network speed, data remaining amount, and playback, and playback time of the contents, and deciding a playback policy of the contents based on at least one of the recognized major section and obtained information.

In accordance with another aspect of the present disclosure, an electronic device for managing a playback of contents is provided. The electronic device includes a communication module configured to receive contents, a memory configured to store the contents and setup information related to a playback of the contents, a display and an audio module configured to play the contents back; and a processor configured to control the communication module, memory, display, and audio module. The processor may perform operations of recognizing a major section of the contents; obtaining at least one of setup information related to a network speed, data remaining amount, and playback, and playback time of the contents; and deciding a playback policy of the contents based on at least one of the recognized major section and obtained information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
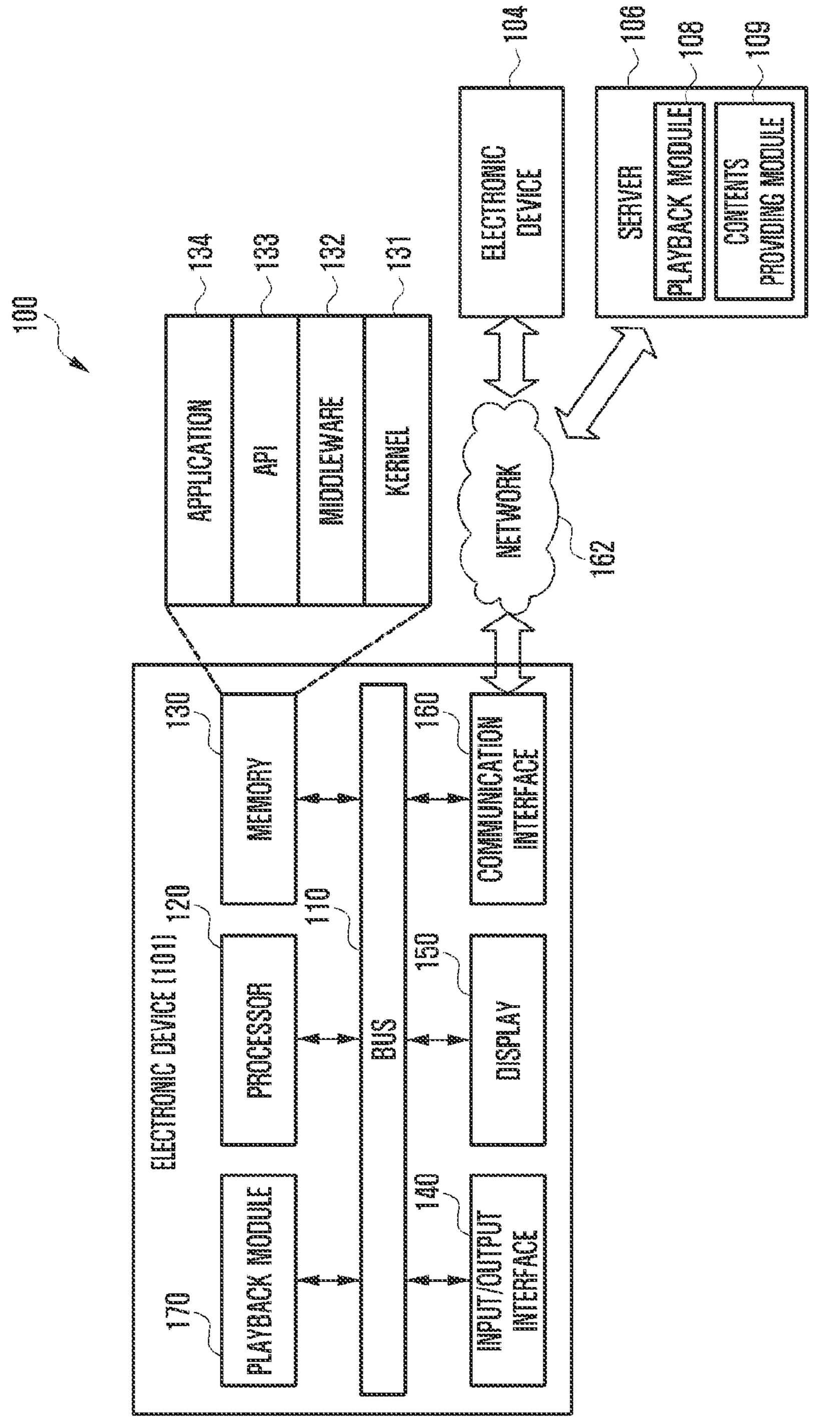
FIG. 1 is a block diagram illustrating a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and the spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

It will be understood that the expressions “comprises” and “may comprise” is used to specify presence of disclosed function, operation, component, etc. but do not preclude the presence of one or more functions, operations, components, etc. It will be further understood that the terms “comprises” and/or “has” when used in this specification, specify the presence of stated feature, number, operation, component, element, or a combination thereof but do not preclude the presence or addition of one or more other features, numbers, operations, components, elements, or combinations thereof. In the present disclosure, the expression “and/or” is taken as specific disclosure of each and any combination of enumerated things. For example, A and/or B is to be taken as specific disclosure of each of A, B, and A and B.

As used herein, terms such as “first,” “second,” etc. are used to describe various components, however, it is obvious that the components should not be defined by these terms. For example, the terms do not restrict the order and/or importance of the corresponding components. The terms are used only for distinguishing one component from another component. For example, a first component may be referred to as a second component and likewise, a second component may also be referred to as a first component, without departing from the teaching of the inventive concept. It will be understood that when an element or layer is referred to as being “on”, “connected to” or “coupled to” another element or layer, it can be directly on, connected or coupled to the other element or layer or intervening elements or layers may be present. In contrast, when an element is referred to as being “directly on,” “directly connected to” or “directly coupled to” another element or layer, there are no intervening elements or layers present.

The terminology used herein is for the purpose of describing particular embodiments only and is not intended to be limiting of the present disclosure.

Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

According to various embodiments of the present disclosure, the electronic device may include devices having an operation support function. Examples of the electronic device may include smartphone, table Personal Computer (PC), mobile phone, video phone, electronic book (e-book) reader, desktop PC, laptop PC, netbook computer, Personal Digital Assistant (PDA), Portable Multimedia Player (PMP), MP3 player, mobile medical appliance, camera, wearable device (e.g. head-mounted device (HMD) such as electronic glasses, electronic clothing, electronic bracelet, electronic necklace, electronic accessory, electronic tattoo, smartwatch, etc.).

According to an embodiment of the present disclosure, the electronic device may be one of smart home appliances having operation support function. Examples of the smart electronic appliance as an electronic device may include television (TV), Digital Versatile Disc (DVD) player, audio player, refrigerator, air-conditioner, vacuum cleaner, electronic oven, microwave oven, laundry machine, air cleaner, set-to box, TV box (e.g. Samsung HomeSync™, Apple TV™, and Google TV™), game console, electronic dictionary, electronic key, camcorder, and electronic frame, etc.

According to an embodiment of the present disclosure, examples of the electronic device may include medical device (e.g. Magnetic Resonance Angiography (MRA), Magnetic Resonance Imaging (MRI), Computed Tomography (CT)), Navigation device, Global Positioning System (GPS) receiver, Event Data Recorder (EDR), Flight Data Recorder (FDR), car infotainment device, maritime electronic device (e.g. maritime navigation device and gyro compass), aviation electronic device (avionics), security device, vehicle head unit, industrial or home robot, Automatic Teller's Machine (ATM) of financial institution, Point Of Sales (POS), etc.

According to an embodiment of the present disclosure, examples of the electronic device may include furniture and building/structure having a communication function, electronic board, electronic signature receiving device, projector, and metering device (e.g. water, electric, gas, and electric wave metering devices). According to various embodiments of the present disclosure, the electronic device may be any combination of the aforementioned devices. According to various embodiments of the present disclosure, the electronic device may be a flexible device. It is obvious to those skilled in the art that the electronic device is not limited to the aforementioned devices.

Descriptions are made of the electronic devices according to various embodiments with reference to accompanying drawings hereinafter. The term 'user' used in various embodiments of the present disclosure may denote a person or a device (e.g. artificial intelligent electronic device) using the electronic device.

FIG. 1 is a block diagram illustrating a network environment 100 including an electronic device according to various embodiments of the present disclosure.

Referring to FIG. 1, the electronic device 101 may include a bus 110, processor 120, memory 130, input/output interface 140, display 150, communication interface 160, and playback module 170.

The bus 110 may be a circuit for connecting the aforementioned elements to each other and transmitting communication (e.g., a control message) between the aforementioned elements.

For example, the processor 120 may receive an instruction from the aforementioned other elements (e.g., the memory 130, the input/output interface 140, the display 150, the communication interface 160, the playback module 170, etc.) through the bus 110, decipher the received instruction, and perform calculation or data processing according to the deciphered instruction.

The memory 130 may store the command or data received from the processor 120 or other components (e.g. input/output interface 140, display 150, communication interface 160, playback module 170, etc.) or generated by the processor 120 or other components. The memory 130 may store program modules including kernel 131, middleware 132, Application Programming Interface (API) 133, applications 134, etc. Each programming module may be implemented as software, firmware, hardware, and any combination thereof.

The kernel 131 may control or manage the system resources (e.g. bus 110, processor 120, and memory 130) for use in executing the operation or function implemented with the middleware 132, the API 133, or the application 134. The kernel 131 also may provide an interface allowing the middleware 132, API 133, or application 134 to access the components of the electronic device 101 to control or manage.

The middleware 132 may work as a relay of data communicated between the API 133 or application 134 and the kernel 131. The middleware 132 may execute control of the task requests from the applications 134 in such a way of assigning priority for use of the system resource (e.g. bus 110, processor 120, and memory 130) of the electronic device to at least one of the applications 134.

The API 133 is the interface for the applications 134 to control the function provided by the kernel 131 or the middleware 132 and may include at least one interface or function (e.g. command) for file control, window control, image control, or text control.

According to various embodiments of the present disclosure, the application 134 may include a Short Message Service (SMS)/Multimedia Message Service (MMS) application, an e-mail application, a calendar application, an alarm application, a health care application (e.g., an application for measuring an amount of exercise or blood sugar), and an environmental information application (e.g., an application for providing an atmospheric pressure, humidity, temperature, and the like). Additionally or alternately, the application 134 may include an application related to an information exchange between the electronic device 101 and an external electronic device (e.g., an electronic device 104). The application related to the information exchange may include, for example, a notification relay application for transferring particular information to the external electronic device or a device management application for managing the external electronic device.

For example, the notification relay application may include a function of transferring, to the external electronic device (e.g., the electronic device 104), notification information generated from other applications of the electronic device 101 (e.g., an SMS/MMS application, an e-mail application, a health management application, an environmental information application, and the like). Additionally or alternatively, the notification relay application may receive notification information from, for example, the external electronic device (e.g., the electronic device 104) and provide the received notification information to a user. For example, the device management application may manage (e.g., install, delete, or update) functions for at least a part of the external electronic device (e.g., the electronic device 104) communicating with the electronic device 101 (e.g., turning on/off the external electronic device itself (or some elements thereof) or adjusting brightness (or resolution) of a display), applications operating in the external electronic device, or services (e.g., a telephone call service or a message service) provided from the external electronic device.

According to various embodiments of the present disclosure, the application 134 may include an application designated according to an attribute (e.g., a type of the electrode device) of the external electronic device (e.g., the electronic device 104). For example, when the external electronic device is an MP3 player, the application 134 may include an application related to the reproduction of music. Similarly, in the case where the external electronic device is a mobile medical appliance, the application 134 may include an application related to health care. According to an embodiment of the present disclosure, the application 134 may include at least one of an application designated to the electronic device 101 and an application received from the external electronic device (e.g., a server 106 or the electronic device 104).

The input/output interface 140 may transfer instructions or data input from a user through an input/output device (e.g., a sensor, a keyboard, or a touch screen) to, for example, the processor 120, the memory 130, the communication interface 160, or the playback module 170 through the bus 110. For example, the input/output interface 140 may provide, to the processor 120, data for a user's touch input through the touch screen. Further, the input/output interface 140 may output, for example, an instruction or data received through the bus 110 from the processor 120, the memory 130, the communication interface 160, and the media playback module 170, through an input/output device (e.g., a speaker or display). For example, the input/output interface 140 may output voice data processed through the processor 120 to the user through the speaker.

The display 150 may display various pieces of information (e.g., multimedia data or text data) to a user.

The communication interface 160 may connect communication between the electronic device 101 and the external electronic device (e.g., the electronic device 104 or the server 106). For example, the communication interface 160 communicates with the external device (e.g., the electronic device 104 or the server 106) while being connected to a network 162 through wireless communication or wired communication. The wireless communication may include at least one of, for example, Wi-Fi, Bluetooth (BT), Near Field Communication (NFC), GPS and cellular communication (e.g., Long Term Evolution (LTE), LTE-Advanced (LTE-A), Code Division Multiple Access (CDMA), Wideband CDMA (WCDMA), Universal Mobile Telecommunication System (UMTS), Wireless Broadband (WiBro), and Global System for Mobile communication (GSM)). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment of the present disclosure, the network 162 may be a communication network. The communication network may include at least one of a computer network, the Internet, the Internet of things, and a telephone network. According to an embodiment of the present disclosure, a protocol (e.g., a transport layer protocol, data link layer protocol, or a physical layer protocol) for communication between the electronic device 101 and the external device may be supported by at least one of the application 134, the API 133, the middleware 132, the kernel 131, and the communication interface 160.

According to an embodiment of the present disclosure, the server 106 can support the electronic device 101 by performing at least one operation (or function) implemented in the electronic device 101. For example, the server 106 may include a playback module 108 for supporting a playback module 170 of the electronic device 101. For example, the playback module 108 can include at least one component of the playback module 170 and perform at least one function as proxy of the playback module 170. Additionally, the server 106 may further include a contents providing module 109 in order to provide contents for the playback modules 170 and 108.

The playback module 170 processes at least a portion of contents obtained from other components such as a processor 120, memory 130, input/output interface 140, and communication interface 160, and can provide it for a user in various methods. For example, the playback module 170 can control at least a function of the electronic device 101 by using the processor 120 or by itself so that contents are provided for a user. According to an embodiment of the present disclosure, the playback module 170 can be included in the configuration of server 106 (for example, playback module 108), and at least one operation implemented by the playback module 170 can be supported by the server 106. Additional information is provided by the playback module 170 through the accompanying FIGS. 2 to 16.

Figure 2:
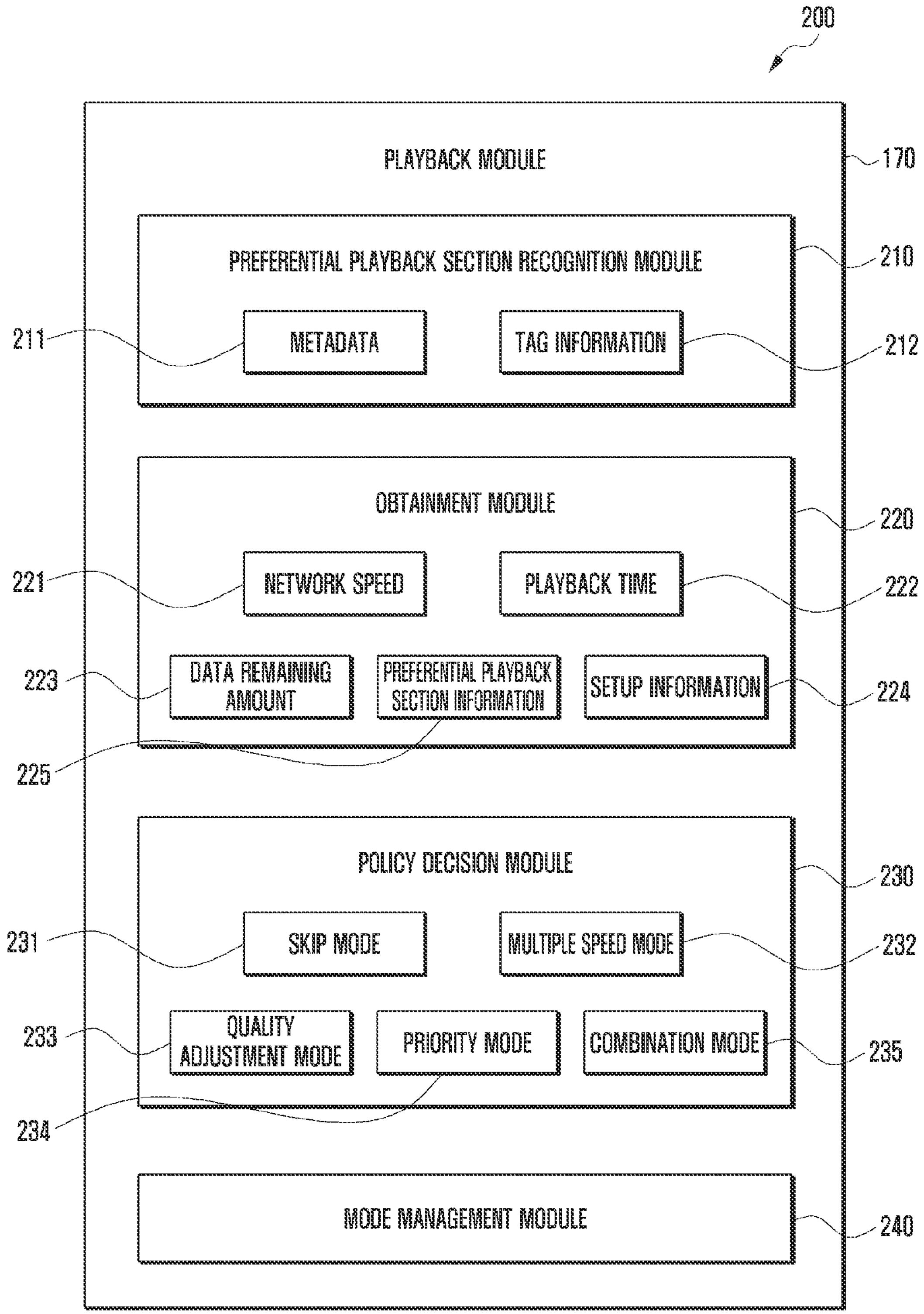
FIG. 2 is a block diagram illustrating a configuration of playback module in an electronic device according to various embodiments of the present disclosure.

FIG. 2 is a block diagram illustrating a configuration 200 of playback module in an electronic device according to various embodiments of the present disclosure.

Referring to FIG. 2, the playback module 170 may include a preferential playback section recognition module 210 (hereafter, 'recognition module'), obtainment module 220, policy decision module 230, and mode management module 240.

The recognition module 210 can obtain information related to the contents such as metadata 211 or tag information 212 from an application 134. Alternatively, the recognition module 210 can obtain the metadata 211 or tag information 212 by directly accessing to the memory 130. Further, the recognition module 210 can obtain the metadata 211 or tag information 212 from an external device (for example, server 106) by using the communication interface 160.

The following is an example of tag information 212.

```
<format>
  <total_frame>4320</total_frame> // Length of Video: 3 min, 24fps 180 sec
  <destination_scene1_start>1650</destination_scene1_start> // Start of important section
  <destination_scene1_end>1850</destination_scene1_end> // End of important section
<1-- optional 1-->
  <audio_channels_number0>2</audio_channels_number0>
  <audio_channels_number1>1</audio_channels_number1>
<1-- optional 2-->
  <framerate0>24</framerate0>
  <framerate1>12</framerate1>
  <framerate2>4</framerate2>
<1-- optional 3-->
  <video_birate0>1000k</video_bitrate0>
  <video_birate1>400k</video_bitrate1>
  <video_birate2>null</video_bitrate2>
<1-- optional 4-->
  <video_resolution0>1920×1080</video_resolution0>
  <video_resolution0>720×180</video_resolution1>
  <video_resolution0>null</video_resolution2>
<1-- optional 5-->
  <audio_birate0>192k</audio_birate0>
  <audio_birate1>64k</audio_birate0>
  <audio_birate2>8k</audio_birate0>
<1-- playcontrol 1-->
  <skip_play>0</skip_play>
  <fast_play>1</fast_play>
</format>
```

The recognition module 210 can recognize a preferential playback section (major section) from the contents based on the metadata 211 or tag information 212. The recognized major section can be used as information for deciding a playback policy of the corresponding contents. The metadata 211 can be a portion of the contents, for example, stored in a reserved area, and the tag information 212 can be separate information tagged to the contents. For example, the metadata 211 and tag information 212 may include executable program information, file format (for example, Audio Video Interleave (AVI)), size, created date, resolution, frame speed (for example, 30 frames/sec), playback time, and major section information. Here, the major section information may include information related to appearance of a major person (for example, a singer), object, or event (or example, traffic accident) of a video. Such major section information may be set by a user of the electronic device 101. Alternatively, the major section information can be received together with contents from other devices (for example, server 106). The recognition module 210 can recognize a major section of contents (for example, video) by identifying major section information.

The recognition module 210 can recognize the major section of corresponding contents by identifying statistical information and user information (for example, an age of user, address, contents information) pre-stored in the electronic device 101. The statistical information is information related to responses from persons watched the corresponding contents, and may be included in the metadata 211 and tag information 212. According to an embodiment of the present disclosure, the statistical information may include information related to an aperture time having the highest response to a video by ages and sexes of persons, and by regions. Accordingly, the recognition module 210 can recognize the aperture time having the highest response as a major section.

The obtainment module 220 can obtain information for deciding a playback policy by calculating, receiving, or identifying. For example, the obtainment module 220 can calculate a network speed 221 in a bps unit based on at least one of a signal bandwidth and Received Signal Strength Indication (RSSI) received from a network 162 (for example, LTE) through the communication interface 160, and data download bandwidth of contents provided by a server. Alternatively, the obtainment module 220 can receive a network speed 221 calculated by other components from the processor 120.

The obtainment module 220 can identify a playback time 222 of the corresponding contents by accessing to the metadata 211 or tag information 212.

The obtainment module 220 can transmit a request message for information of data remaining amount 223 to an external device (for example, a server of LTE communication provider) through the communication interface 160, and receive a response message including the data remaining amount 223 from the external device. Here, if the electronic device 101 is registered in an LTE service, the data remaining amount 223 may indicate a data amount (for example, 1 GB, 5 GB, or unlimited amount) downloadable through the LTE by the electronic device 101 for a predetermined period (for example, a month) according to a charging policy. Alternatively, the obtainment module 220 can receive a data remaining amount 223 calculated by other components in real time from the processor 120. According to another embodiment of the present disclosure, the obtainment module 220 can calculate presently remaining days together with the data remaining amount 223. For example, if the predetermined period is a month and the current date is Mar. 3, 2014, the remaining days become 28.

The obtainment module 220 can identify setup information 224 determined by a user related to a playback policy from the memory 130. The setup information may include at least one of various terminal setup items such as a battery (power) saving state or a time saving state (for example, time limitation of video watching). Further, the obtainment module 220 can receive preferential playback section information 225 from the recognition module 210.

The policy decision module 230 can determine a playback mode of contents based on the information identified by the obtainment module 220. Alternatively, the policy decision module 230 can determine the playback mode of contents based on the information set by a user. For example, the playback mode may be determined from a skip mode 231, multiple speed mode 232, quality adjustment mode 233, priority mode 234, and combination mode 235, however the playback mode is not limited to the above examples. In a playback of corresponding contents, the skip mode 231 may perform an operation of informing a skip of non-major section to a user and an operation of skipping the non-major section. The multiple speed mode 232 may perform an operation of playing at least a portion of contents in a higher speed than a normal speed (i.e., playing all the frames of contents in a constant speed). For example, a triple speed playback may operate by skipping 2 frames for every 3 frames. According to an embodiment of the present disclosure, if the time for video watching is limited according to setup information 224 determined by a user, the multiple speed mode 232 may automatically determine a multiple speed of playback so that the playback can be finished in the limited time. The quality adjustment mode 233 may play contents back by adjusting the quality of at least a portion of the contents. The priority mode 234 plays a major section back prior to a non-major section. The combination mode 235 is a mode combining at least two of the above modes. For example, the combination mode 235 may omit a download of non-major section and perform a streaming playback by downloading only the major section in a streaming playback of video.

According to an embodiment of the present disclosure, in case that the contents is a music video of a girl group A, the main audience of the contents may be men in an age group of 30s and women in an age group of 20s. If users of the electronic devices 101 are men in the age group of 30s and the electronic devices 101 contain many photos of the girl group, the major section of the corresponding music video is recognized as an aperture time of the girl group A by the recognition module 210, and the playback policy of the corresponding music video may be determined to a resolution priority mode by the policy decision module 230 (for example, high resolution for a major section and low sound quality for the whole section). If users of the electronic devices 101 are women in the age group of 20s and the electronic device 101 contain many music files of the girl group, the playback policy of the corresponding music video may be determined to be a sound quality priority mode by the policy decision module 230 (for example, low resolution/high sound quality). If the users of the electronic devices 101 are women in the age group of 20s and the electronic device 101 contain many music files and photos of the girl group, the playback policy of the corresponding music video can be determined to a resolution priority mode by the policy decision module 230. If the users of the electronic devices 101 are men in an age group of 40s, the playback policy of corresponding music video can be determined to a low quality mode by the policy decision module 230 (for example, low resolution/low sound quality). Alternatively, because the age group of 40s is adjacent to the age group of 30s, the playback policy could be determined to the resolution priority mode.

The mode management module 240 can operate a playback of the corresponding contents in a playback mode determined by the policy decision module 230.

The playback module 170 is shown to be configured with the processor 120 and a separate component, however, according to another embodiment of the present disclosure, the processor 120 may include at least a portion of the above components 210 to 240 of the playback module 170.

Figure 3:
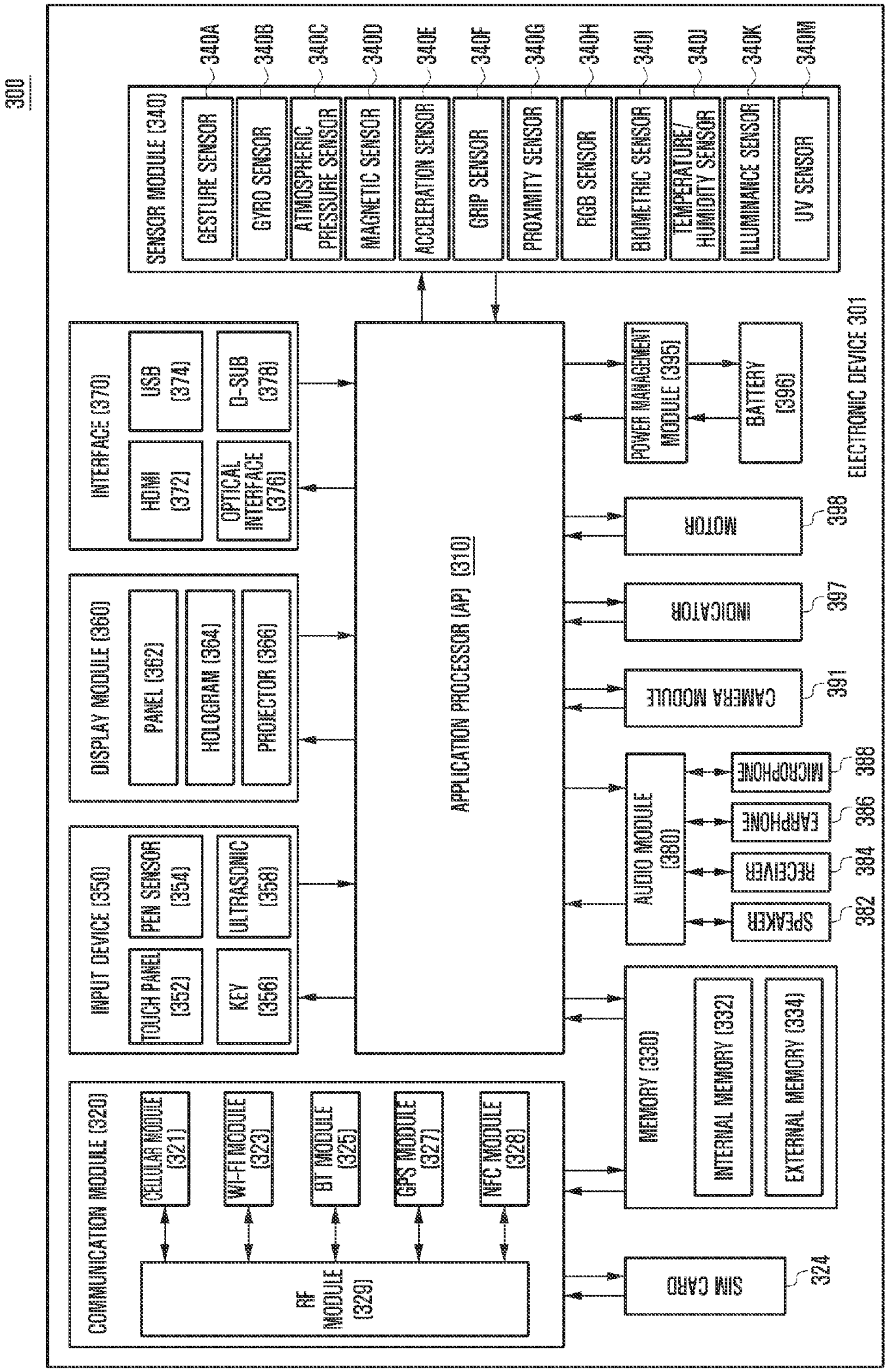
FIG. 3 is a block diagram illustrating a configuration of electronic device according to various embodiments of the present disclosure.

FIG. 3 is a block diagram illustrating a configuration 300 of the electronic device according to various embodiments of the present disclosure. The electronic device 301 may be of the whole or a part of the electronic device 101.

Referring to FIG. 3, the electronic device 301 may include an Application Processor (AP) 310, a communication module 320, a Subscriber Identity Module (SIM) card 324, a memory 330, a sensor module 340, an input device 350, a display 360, an interface 370, an audio module 380, a camera module 391, a power management module 395, a battery 396, an indicator 397, and a motor 398.

The AP 310 may operate an Operating System (OS) and/or application programs to control a plurality of hardware and/or software components connected to the AP 310 and perform data-processing and operations on multimedia data. For example, the AP 310 may be implemented in the form of System on Chip (SoC). According to an embodiment of the present disclosure, the AP 310 may include a Graphic Processing Unit (GPU) (not shown).

The communication module 320 (e.g. communication interface 160) may perform data communication with other electronic devices (e.g. electronic device 104 and server 106) through a network. According to an embodiment of the present disclosure, the communication module 320 may include a cellular module 321, a Wi-Fi module 323, a BT module 325, a GPS module 327, an NFC module 328, and a Radio Frequency (RF) module 329.

The cellular module 321 is responsible for voice and video communication, text messaging, and Internet access services through a communication network (e.g. LTE, LTE-A, CDMA, WCDMA, UMTS, WiBro, and GSM networks). The cellular module 321 may perform identification and authentication of electronic devices in the communication network using the SIM card 324. According to an embodiment of the present disclosure, the cellular module 321 may perform at least one of the functions of the AP 310. For example, the cellular module 321 may perform at least a part of the multimedia control function.

According to an embodiment of the present disclosure, the cellular module 321 may include a Communication Processor (CP). The cellular module 321 may be implemented in the form of SoC. Although the cellular module 321 (e.g. communication processor), the memory 330, and the power management module 395 are depicted as independent components separated from the AP 310, the present disclosure is not limited thereto but may be embodied in a way that the AP includes at least one of the components (e.g. cellular module 321).

According to an embodiment of the present disclosure, each of the AP 310 and the cellular module 321 (e.g. communication processor) may load a command or data received from at least one of the components on a non-volatile or volatile memory and process the command or data. The AP 310 or the cellular module 321 may store the data received from other components or generated by at least one of other components in the non-volatile memory.

Each of the Wi-Fi module 323, the BT module 325, the GPS module 327, and the NFC module 328 may include a processor for processing the data it transmits/receives. Although the cellular module 321, the Wi-Fi module 323, the BT module 325, the GPS module 327, and the NFC module 328 are depicted as independent blocks; at least two of them (e.g. communication processor corresponding to the cellular module 321 and Wi-Fi processor corresponding to the Wi-Fi module 323) may be integrated in the form of SoC.

The RF module 329 is responsible for data communication, e.g. transmitting/receiving RF signals. Although not depicted, the RF module 329 may include a transceiver, a Power Amp Module (PAM), a frequency filter, and a Low Noise Amplifier (LNA). The RF module 329 also may include the elements for transmitting/receiving electric wave in free space, e.g. conductor or conductive wire. Although FIG. 3 is directed to the case where the Wi-Fi module 323, the BT module 325, the GPS module 327, and the NFC module 328 are sharing the RF module 329, the present disclosure is not limited thereto but may be embodied in a way that at least one of the Wi-Fi module 323, the BT module 325, the GPS module 327, and the NFC module 328 transmits/receives RF signals an independent RF module.

The SIM card 324 may be designed so as to be inserted into a slot formed at a predetermined position of the electronic device. The SIM card 324 may store unique identity information (e.g. Integrated Circuit Card Identifier (ICCID)) or subscriber information (e.g. International Mobile Subscriber Identity (IMSI)).

The memory 330 (e.g. memory 130) may include at least one of the internal memory 332 and an external memory 334. The internal memory 332 may include at least one of a volatile memory (e.g. Dynamic Random Access Memory (DRAM), Static RAM (SRAM), Synchronous DRAM (SDRAM) or a non-volatile memory (e.g. One Time Programmable Read Only Memory (OTPROM), PROM, Erasable and Programmable ROM (EPROM), Electrically Erasable and Programmable ROM (EEPROM), mask ROM, flash ROM, NAND flash memory, and NOR flash memory).

According to an embodiment of the present disclosure, the internal memory 332 may be a Solid State Drive (SSD). The external memory 334 may be a flash drive such as Compact Flash (CF), Secure Digital (SD), micro-SD, Mini-SD, extreme Digital (xD), and Memory Stick. The external memory 334 may be connected to the electronic device 301 through various interfaces functionally. According to an embodiment of the present disclosure, the electronic device 301 may include a storage device (or storage medium) such as hard drive.

The sensor module 340 may measure physical quantity or check the operation status of the electronic device 301 and convert the measured or checked information to an electric signal. The sensor module 340 may include at least one of gesture sensor 340A, Gyro sensor 340B, barometric sensor 340C, magnetic sensor 340D, acceleration sensor 340E, grip sensor 340F, proximity sensor 340G, color sensor 340H (e.g. Red, Green, Blue (RGB) sensor), bio sensor 340I, temperature/humidity sensor 340J, illuminance sensor 340K, and Ultra Violet (UV) sensor 340M.

Additionally or alternatively, the sensor module 340 may include E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), and fingerprint sensor (not shown). The sensor module 340 may further include a control circuit for controlling at least one of the sensors included therein.

The input device 350 may include a touch panel 352, a (digital) pen sensor 354, keys 356, and an ultrasonic input device 358. The touch panel 352 may be one of capacitive, resistive, infrared, microwave type touch panel. The touch panel 352 may include a control circuit. In the case of the capacitive type touch panel, it is possible to detect physical contact or approximation. The touch panel 352 may further include a tactile layer. In this case, the touch panel 352 may provide the user with haptic reaction.

The (digital) pen sensor 354 may be implemented with a sheet with the same or similar way as touch input of the user or a separate recognition sheet. The keys 356 may include physical buttons, optical key, and keypad. The ultrasonic input device 358 is a device capable of checking data by detecting sound wave through a microphone 288 and may be implemented for wireless recognition. According to an embodiment of the present disclosure, the electronic device 301 may receive the user input made by means of an external device (e.g. computer or server) connected through the communication module 320.

The display 360 (e.g. display module 150) may include a panel 362, a hologram device 364, and a projector 366. The panel 362 may be a Liquid Crystal Display (LCD) panel or an Active Matrix Organic Light Emitting Diodes (AMOLED) panel. The panel 362 may be implemented so as to be flexible, transparent, and/or wearable. The panel 362 may be implemented as a module integrated with the touch panel 352. The hologram device 364 may present 3-dimensional image in the air using interference of light. The projector 366 may project an image to a screen. The screen may be placed inside or outside the electronic device. According to an embodiment of the present disclosure, the display 360 may include a control circuit for controlling the panel 362, the hologram device 364, and the projector 366.

The interface 370 may include an HDMI 372, a USB 374, an optical interface 376, and a D-subminiature (D-sub) 378. The interface 370 may include the communication interface 160 as shown in FIG. 1. Additionally or alternatively, the interface 370 may include a Mobile High-definition Link (MHL) interface, an SD/MMC card interface, and infrared Data Association (irDA) standard interface.

The audio module 380 may convert sound to electric signal and vice versa. At least a part of the audio module 380 may be included in the input/output interface 140 as shown in FIG. 1. The audio module 380 may process the audio information input or output through the speaker 382, the receiver 384, the earphone 386, and the microphone 388.

The camera module 391 is a device capable of taking still and motion pictures and, according to an embodiment of the present disclosure, includes at least one image sensor (e.g. front and rear sensors), a lens (not shown), and Image Signal Processor (ISP) (not shown), and a flash (e.g. LED or xenon lamp) (not shown).

The power management module 395 may manage the power of the electronic device 301. Although not shown, the power management module 395 may include a Power Management Integrated Circuit (PMIC), a charger IC, a battery, and a battery or fuel gauge.

The PMIC may be integrated into an IC or SoC semiconductor. The charging may be classified into wireless charging and wired charge. The charger IC may charge the battery and protect the charger against overvoltage or overcurrent. According to an embodiment of the present disclosure, the charger IC may include at least one of wired charger and wireless charger ICs. Examples of the wireless charging technology includes resonance wireless charging and electromagnetic wave wireless charging, and there is a need of extra circuit for wireless charging such as coil loop, resonance circuit, and diode.

The battery gauge may measure the residual power of the battery 396, charging voltage, current, and temperature. The battery 396 may store or generate power and supply the stored or generated power to the electronic device 301. The battery 396 may include a rechargeable battery or a solar battery.

The indicator 397 may display operation status of the electronic device 301 or a part of the electronic device, booting status, messaging status, and charging status. The motor 398 may converts the electronic signal to mechanical vibration. Although not shown, the electronic device 301 may include a processing unit (e.g. GPU) for supporting mobile TV. The processing unit for supporting the mobile TV may be able to processing the media data abiding by the broadcast standards such Digital Multimedia Broadcasting (DMB), Digital Video Broadcasting (DVB), and media flow.

The above enumerated components of the electronic device of the present disclosure may be implemented into one or more parts, and the names of the corresponding components may be changed depending on the kind of the electronic device. The electronic device of the present disclosure may include at least one of the aforementioned components with omission or addition of some components. The components of the electronic device of the present disclosure may be combined selectively into an entity to perform the functions of the components equally as before the combination.

Figure 4:
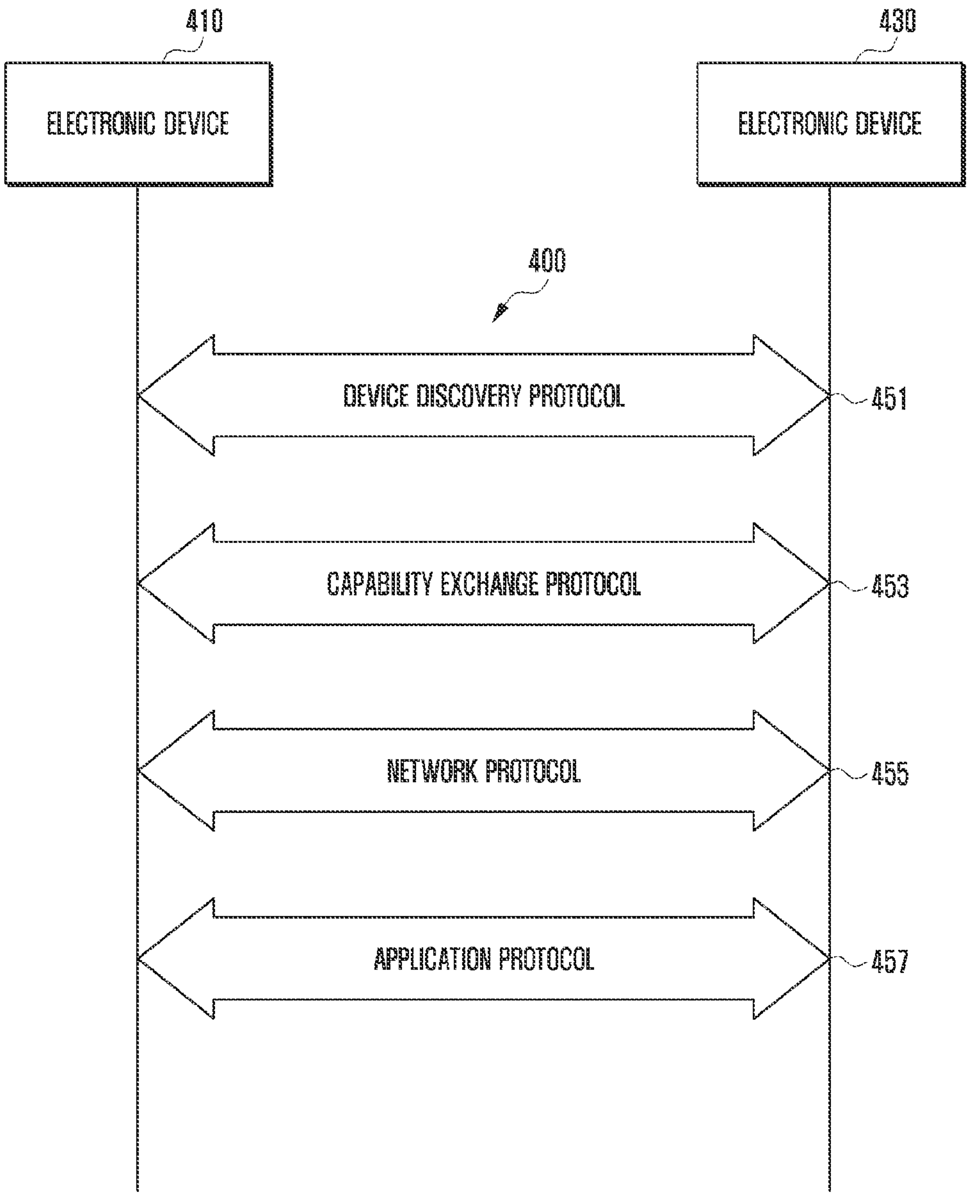
FIG. 4 is a flow chart illustrating a communication protocol between electronic devices according to various embodiments of the present disclosure.

FIG. 4 is a flow chart illustrating a communication protocol between electronic devices according to various embodiments of the present disclosure.

Referring to FIG. 4, a communication protocol 400 may include a device discovery protocol 451, capability exchange protocol 453, network protocol 455, and application protocol 457.

According to an embodiment of the present disclosure, the device discovery protocol 451 may be a protocol for detecting communicable external electronic devices (for example, 410 and 430), and for connecting to the detected external electronic devices. For example, by using the device discovery protocol 451, the electronic device 410 (or electronic device 101) can detect the electronic device 430 (or electronic device 104) through a communication system (for example, WiFi, BT, or USB) applicable in the electronic device 410. For the connection with the electronic device 430, the electronic device 410 can obtain and store identification information of the electronic device 430 by using the device discovery protocol 451. The electronic device 410 can open a communication channel with the electronic device 430 based on the identification information.

According to an embodiment of the present disclosure, the device discovery protocol 451 may be a protocol for performing mutual authentication between electronic devices. For example, the electronic device 410 can perform the authentication between the electronic device 410 and the electronic device 430 based on the communication information for a connection with the electronic device 430 such as an MAC (Media Access Control) address, UUID (Universally Unique Identifier), SSID (Subsystem Identification), and IP (Internet Protocol) address.

According to an embodiment of the present disclosure, the capability exchange protocol 453 may be a protocol for exchanging information related to a supportable service function at least one of the electronic device 410 and the electronic device 430. For example, the electronic device 410 and electronic device 430 can exchange information related to the currently provided service function through the capability exchange protocol 453. The exchangeable information may include identification information indicating a specific service among a plurality of services supporting the electronic device 410 and electronic device 430. For example, the electronic device 410 can receive identification information of a specific service provided by the electronic device 430 through the capability exchange protocol 453. In this case, the electronic device 410 can identify whether the electronic device 410 can support the specific service based on the received identification information.

According to an embodiment of the present disclosure, the network protocol 455 may be a protocol for controlling a data flow between the electronic devices (for example, electronic device 410 and electronic device 430) connected for synchronization of service through communication. For example, at least one of the electronic device 410 and electronic device 430 may perform an error control or a data quality control through the network protocol 455. Additionally, the network protocol 455 can determine a transmission format of data exchanged between the electronic device 410 and electronic device 430. Further, at least one of the electronic device 410 and electronic device 430 can perform a session management (for example, connection of session or termination of session) in order to exchange data each other by using the network protocol 455.

According to an embodiment of the present disclosure, the application protocol 457 may be a protocol for providing a procedure or information so that data exchange related to a service can be provided for an external electronic device. For example, the electronic device 410 (or electronic device 101) can provide a service for the electronic device 430 (or electronic device 104, or server 106) through the application protocol 457.

According to an embodiment of the present disclosure, the communication protocol 400 may include a standard communication protocol, communication protocol designated by a person or group (for example, communication device manufacturer or network provider, or their combinations).

Figure 5:
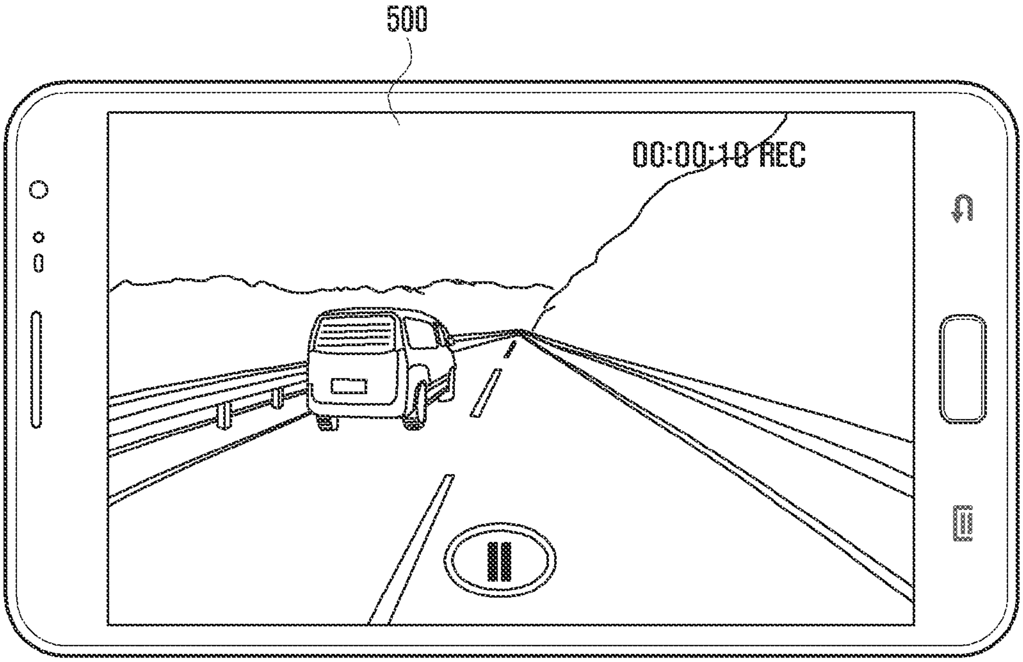
FIG. 5 is an example drawing illustrating a recording screen in an electronic device according to various embodiments of the present disclosure.

FIG. 5 is an example drawing illustrating a recording screen 500 in an electronic device according to various embodiments of the present disclosure.

An AP 310 of the electronic device 301 can obtain environmental situation information from other components while recording. The AP 310 can set a portion of recorded contents as 'major section' by using the obtained information. According to an embodiment of the present disclosure, the AP 310 can monitor an environmental situation in real time during the recording by synchronizing (receiving detection information) with a sensor module 340 (for example, acceleration sensor 340E) or by synchronizing with a microphone 388 through an audio module 380, and set a recorded section as the major section corresponding to an impact if the impact is generated during the monitoring. The AP 310 can store setup information as metadata or tag information in the memory 330 together with the corresponding contents. Alternatively, the setup information can be stored in an external device (for example, server 106) together with the corresponding contents.

Figure 6:
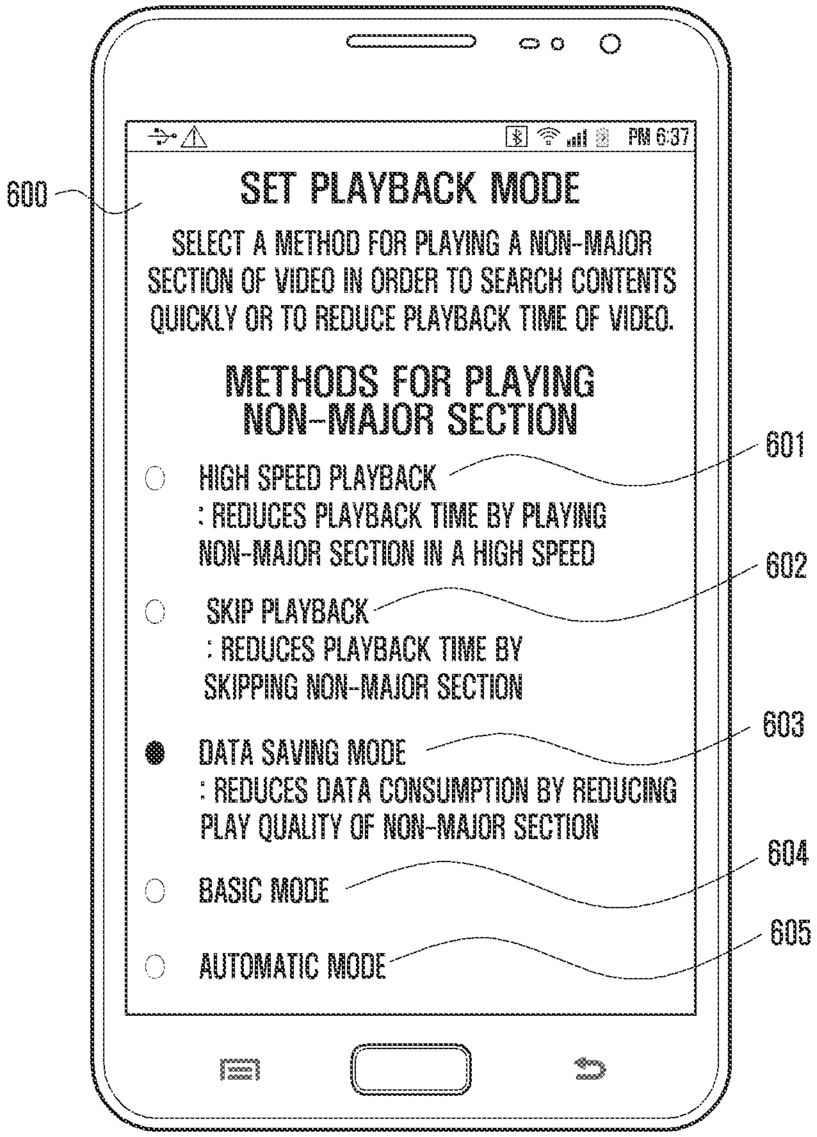
FIG. 6 is an example drawing illustrating a playback mode setting screen in an electronic device according to various embodiments of the present disclosure.

FIG. 6 is an example drawing illustrating a playback mode setting screen in an electronic device according to various embodiments of the present disclosure.

A user can set a playback policy of the contents. For example, the AP 310 of electronic device 301 can control the display unit 360 to display a playback mode setup screen 600 responding to a user's request. The playback mode setup screen 600 may include an item 601 indicating a multiple speed mode, item 602 indicating a skip mode, item 603 indicating a data saving mode (for example, quality adjustment mode), item 604 indicating a basic mode (for example, playing contents back in the same quality and constant speed), and item 605 indicating an automatic mode. If the playback mode is set to the automatic mode, the AP 310 can determine a playback policy based on the information related to the playback policy (for example, information obtained by the obtainment module 220).

Figure 7:
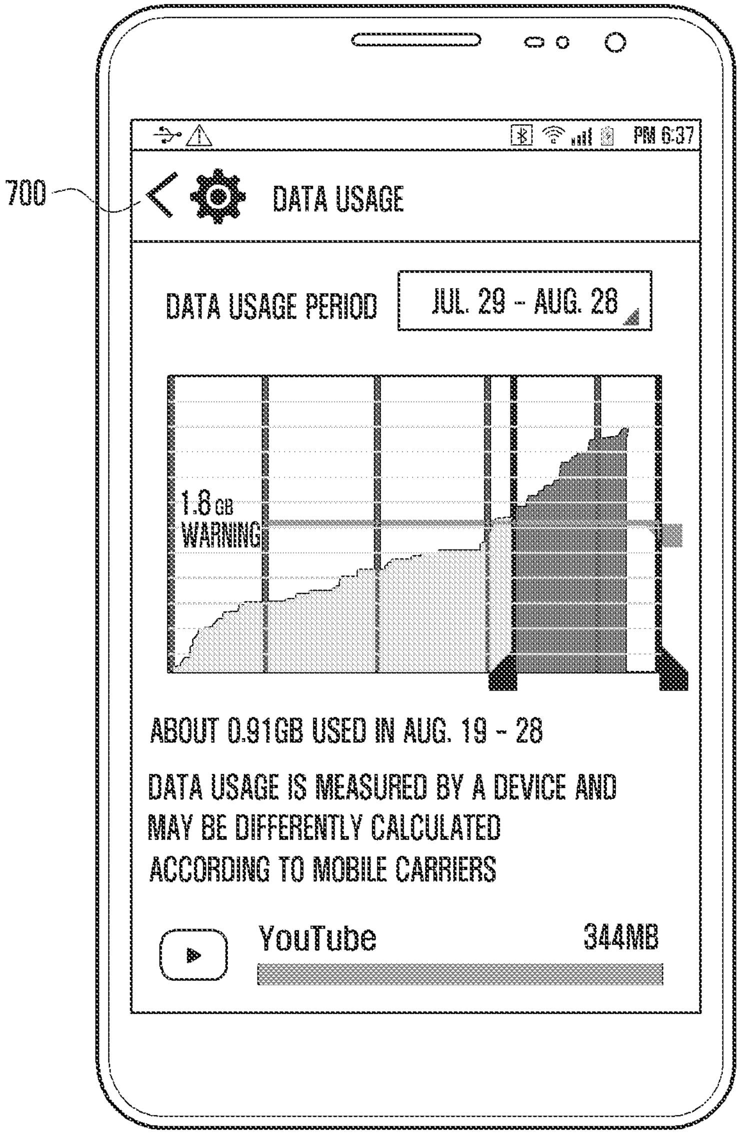
FIG. 7 is an example drawing illustrating a data usage screen in an electronic device according to various embodiments of the present disclosure.

FIG. 7 is an example drawing illustrating a data usage screen in an electronic device according to various embodiments of the present disclosure.

The AP 310 of electronic device 301 can obtain a data usage amount 700. According to an embodiment of the present disclosure, the AP 310 of electronic device 301 can measure the data usage amount 700 in real time by synchronizing with other components (for example, cellular module 821). According to an embodiment of the present disclosure, the AP 310 can transmit a request message for information of the data usage amount 700 to an external device (for example, a server of communication provider operating an LTE), and receive a response message including the data usage amount 700 from the external device. Further, the AP 310 calculate a data remaining amount (for example, by using a formula: data remaining amount=total amount allocated for a predetermined period—data usage amount 700). If a predetermined condition is satisfied (for example, if a request for streaming playback of contents is received from the input device 350), the AP 310 can control the display unit 360 to display the data usage amount 700 or data remaining amount.

Figure 8A:
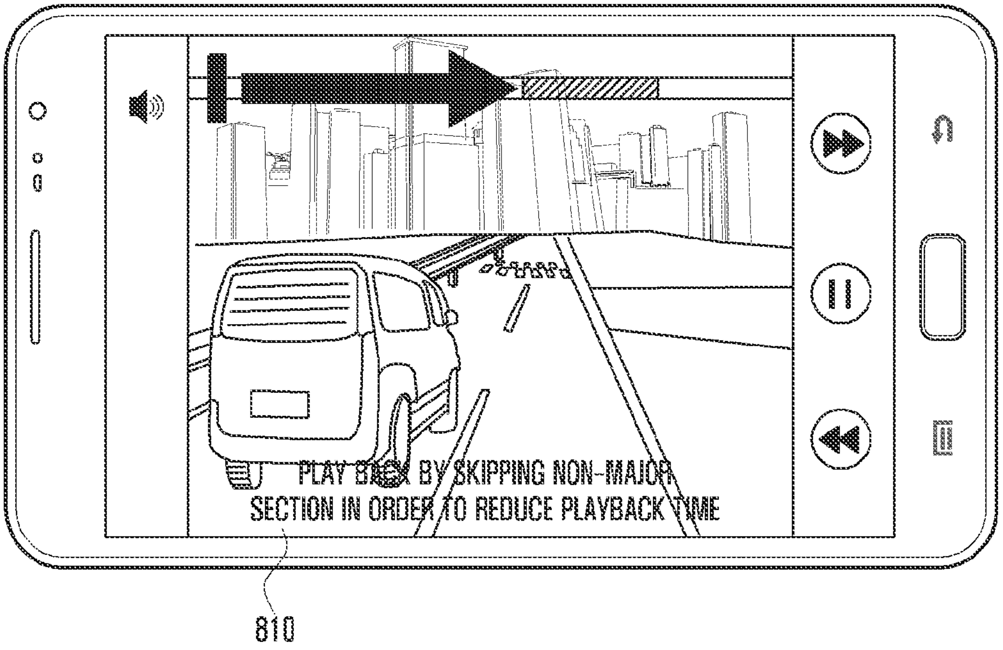
FIGS. 8A and 8B are example drawings illustrating a skip mode in an electronic device according to various embodiments of the present disclosure.
Figure 8B:
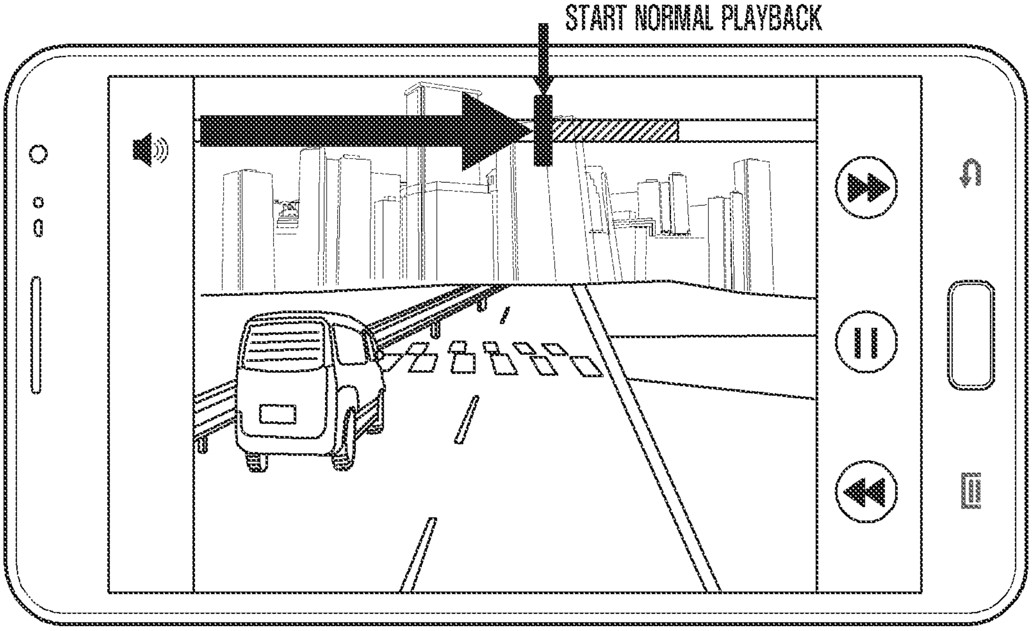

FIGS. 8A and 8B are example drawings illustrating a skip mode in an electronic device according to various embodiments of the present disclosure.

If the playback policy of video is set to the skip mode, the AP 310 of electronic device 301 can obtain a major section of the corresponding video by identifying or receiving. For example, before performing a playback of video, the AP 310 can obtain a major section of the corresponding video by identifying metadata or tag information of the corresponding video stored in the memory 330. Alternatively, the AP 310 can receive corresponding information by requesting the server 106 for information related to the major section before downloading a video from other devices (for example, server 106).

If the major section is obtained, the AP 310 can operate a playback of corresponding video in a skip mode.

Referring to FIG. 8A, before skipping a non-major section, the AP 310 can control the display unit 360 to display a guide sentence 810 (for example, "Start playback by skipping non-major section to reduce playback time").

Referring to FIG. 8B, after skipping the non-major section, the AP 310 can play frames of major section in a constant speed.

FIGS. 9A, 9B, 9C, 9D, and 10 are example drawings illustrating a priority and quality control mode according to various embodiments of the present disclosure.

Figure 9A:
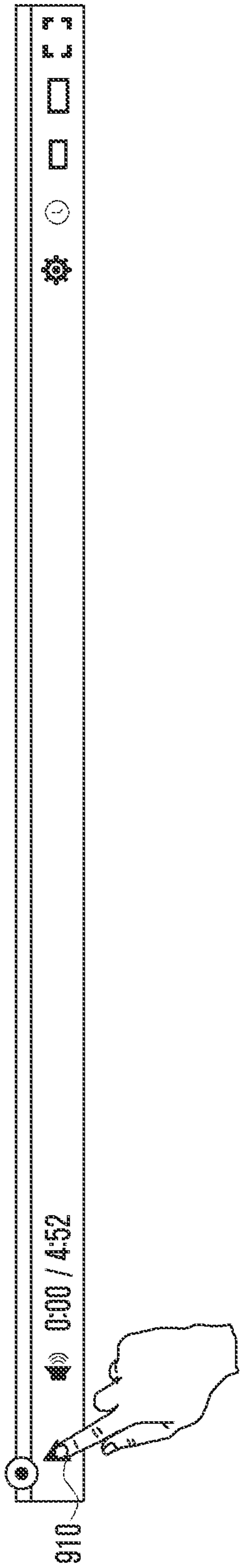
FIGS. 9A, 9B, 9C, 9D, and 10 are example drawings illustrating a priority and quality control mode according to various embodiments of the present disclosure.

Referring to FIG. 9A, if a user presses a playback button 910, the AP 310 of electronic device can identify a specification of video to be played back (for example, resolution and frame rate). According to an embodiment of the present disclosure, the AP 310 can control the communication module 320 to request a contents providing server for tag information of video. The communication module 320 can transmit the tag information received from the contents providing server to the AP 310. The AP 310 identifies a video specification of the tag information and a video specification of display unit 360 (for example, panel 362), and optimizes the video for the display unit 360 by comparing the specifications. For example, if the resolution of video is higher than that of panel 362, the AP 310 can control the communication module 320 to request the contents providing server for a low specification video.

If the optimization of specification is finished, the AP 310 can identify a major section of video. According to an embodiment of the present disclosure, the AP 310 can identify a major section from the received tag information.

Figure 9B:
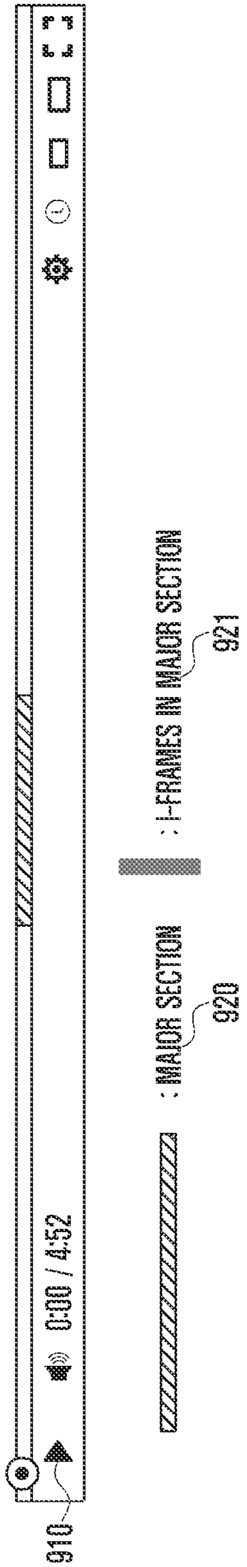

Referring to FIG. 9B, the AP 310 can control the display unit 360 to display a major section 920.

Figure 9C:
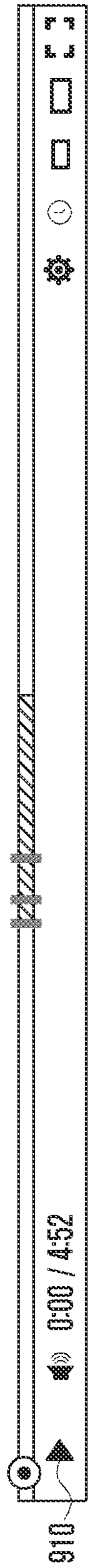
Figure 9D:
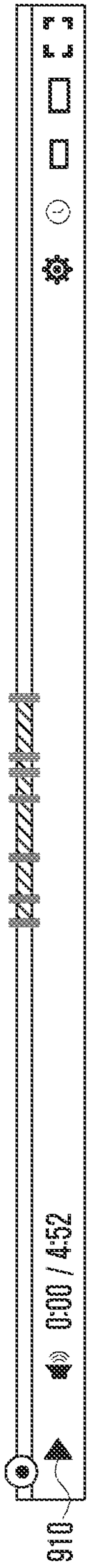

Referring to FIGS. 9C and 9D, the AP 310 can control the communication module 320 to request the contents providing server for I-frames from the major section 920. The AP 310 can calculate a network speed based on the time required for receiving the I-frames 921.

The AP 310 can compare the network speed with a required speed. Here, the required speed may mean a network speed required for playing a video back without disconnection (for example, 1 Mbps). The AP 310 can adjust the quality of video playback according to the comparison result.

According to an embodiment of the present disclosure, if the comparison result is "high resolution playback required speed<current network speed", the AP 310 can play the video back in a high quality and secure a major section through a float bandwidth by controlling to synchronize with communication module 320, display unit 360, and audio module 380. Accordingly, the major section of video can be played back without disconnection, even though a network problem is generated during a streaming playback due to entrance to a tunnel.

If the comparison result is "low resolution playback required speed<current network speed<high resolution playback required speed", the AP 310 can play the major section of video in a native bit transmission rate and play the remainder with a reduced bit transmission rate by controlling to synchronize with communication module 320, display unit 360, and audio module 380.

Figure 10:
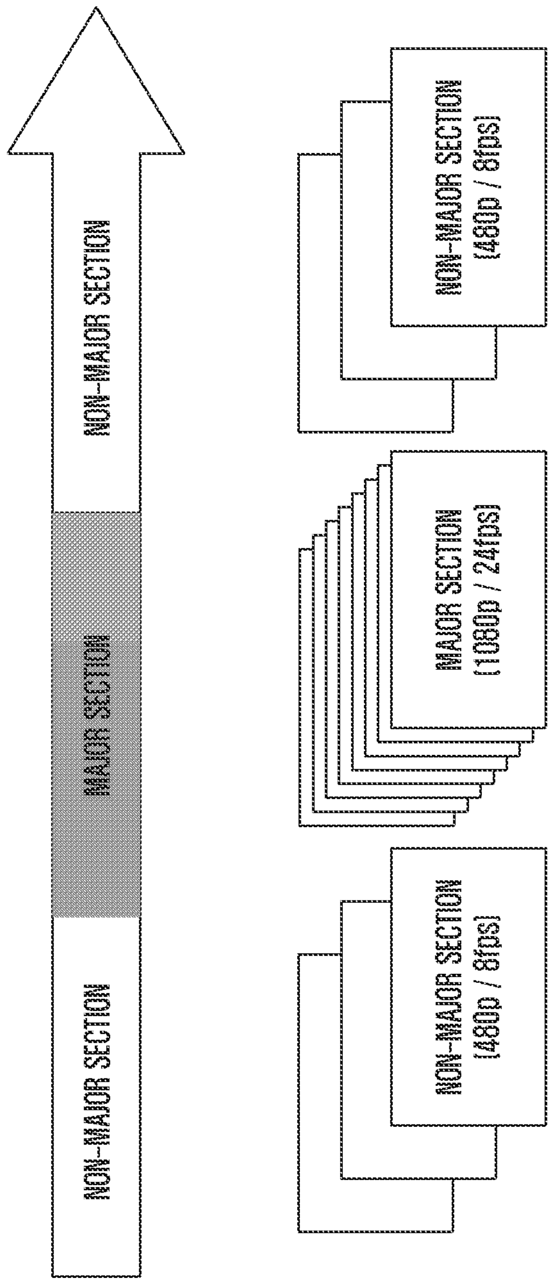

For example, referring to FIG. 10, a non-major section may be played with a low quality of 480 pixel (P)/8 frames per second (FPS) and the major section with a high quality of 1080 P/24 FPS. Further, once the playback is started, the AP 310 can sequentially receive data and receive voice data of the major section through a float bandwidth. Namely, the AP 310 can secure a screen shot of major section (for example, I-frames 921) and voice data in advance. Accordingly, even though a network problem is generated during a streaming playback due to entrance to a tunnel, the screen shot of major section and voice can be played without problem.

If the comparison result is "current network speed<low resolution playback required speed", the AP 310 can play the contents back in a voice mode. For example, the AP 310 can control the display unit 360 to sequentially display I-frames 921 of the major section (i.e., slide show). Further, AP 310 can receive only the voice data by requesting the contents providing server, and play the received voice back while performing a slide show.

Factors for adjusting the playback quality may include factors considered in a scalable coding such as a video/audio bit transmission rate (kilobits per second (Kbps), signal-to-noise Ratio (SNR)), video/audio depth (bit), FPS, audio sample rate (kilohertz (KHz)), number of audio channels (1 to 6), video frame rate (FPS), color gamut, aspect ratio, and hybrid codec (Lo:H.264/Hi:HEVC).

According to an embodiment of the present disclosure, the electronic device may include a communication module configured to receive contents; a memory configured to store the contents and setup information related to a playback of the contents; a display and an audio module configured to play the contents back; and a processor configured to control the communication module, memory, display, and audio module. The processor may perform operations of: recognizing a major section of the contents; obtaining at least one of setup information related to a network speed, data remaining amount and playback, and playback time of the contents; and deciding a playback policy of the contents based on at least one of the recognized major section and obtained information.

Figure 11:
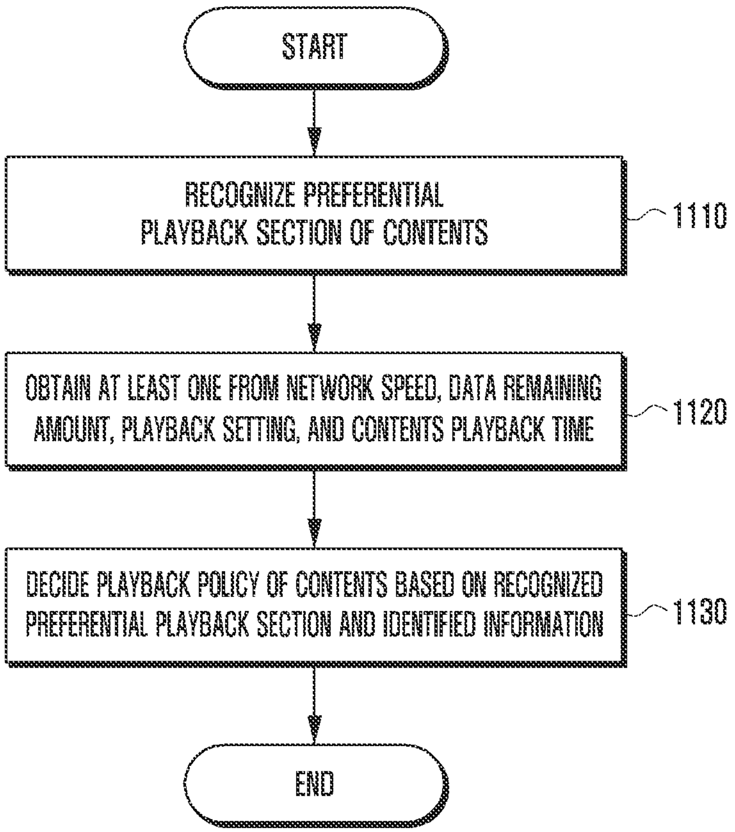
FIG. 11 is a flowchart illustrating a method of deciding a playback policy in an electronic device according to various embodiments of the present disclosure.

FIG. 11 is a flowchart illustrating a method of deciding a playback policy in an electronic device according to various embodiments of the present disclosure.

The AP 310 obtains information related to contents and recognizes a major section of the contents based on this at operation 1110. The AP 310 obtains in formation at least one of a network speed, data remaining amount, setup information related to a playback, and playback time of contents at operation 1120. The AP 310 determines a playback policy of the contents based on the recognized major section and obtained information at operation 1130. According to an embodiment of the present disclosure, in case of "network speed>threshold value V-th1", the AP 310 can determine the playback policy to a basic mode (for example, high resolution/constant playback speed). In case of "network speed>threshold value V-th1" and "data remaining amount<threshold value D-th", the AP 310 can determine the playback policy to a data saving mode (for example, skip mode, quality adjustment mode, multiple speed mode, or voice mode). In case of "network speed>threshold value V-th1" and "playback time>threshold value T-th", the AP 310 can determine the playback policy to a time saving mode (for example, skip mode, priority mode, or multiple speed mode). In case of "network speed<threshold value V-th1", the AP 310 can determine the playback policy to a quality adjustment mode. In case of "network speed<threshold value V-th2(V-th2<V-th1)", the AP 310 can determine the playback policy to a combination mode (quality adjustment mode+skip mode). The setup information related to the playback can have the highest priority among the identified information. Namely, the AP 310 can operate the playback of contents according to a playback mode set by a user, regardless of a network speed, data remaining amount, and playback time of contents.

According to an embodiment of the present disclosure, the data saving mode may be determined according to a data remaining amount and remaining days. For example, in case of "data remaining amount>threshold value D-th" and "remaining days<threshold value T-th", the AP 310 can determine the playback policy to a basic mode. In case of "data remaining amount>threshold value D-th" and "remaining days>threshold value T-th", the AP 310 can determine the playback policy to a data saving mode. According to an embodiment of the present disclosure, a user can use data (for example, 5 GB) by equally dividing in a predetermined period.

Figure 12:
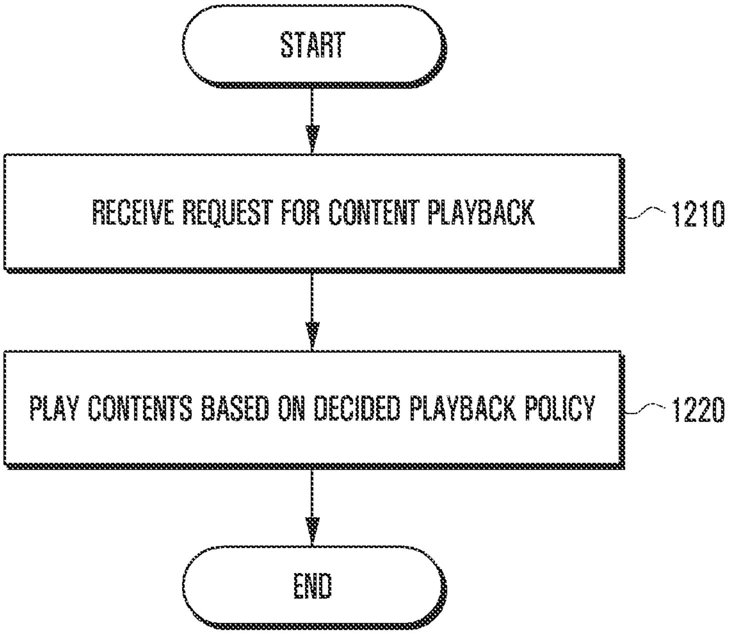
FIG. 12 is a flowchart illustrating a method of playing contents back in an electronic device according to an embodiment of the present disclosure.

FIG. 12 is a flowchart illustrating a method of playing contents back in an electronic device according to an embodiment of the present disclosure.

The AP 310 receives a request for a playback of contents from other devices such as a microphone 388, sensor module 340, input device 350, or communication module 320 at operation 1210. Responding to the request, the AP 310 operates a playback of contents according to the playback policy (for example, playback policy determined at operation 1130) at operation 1220.

Figure 13:
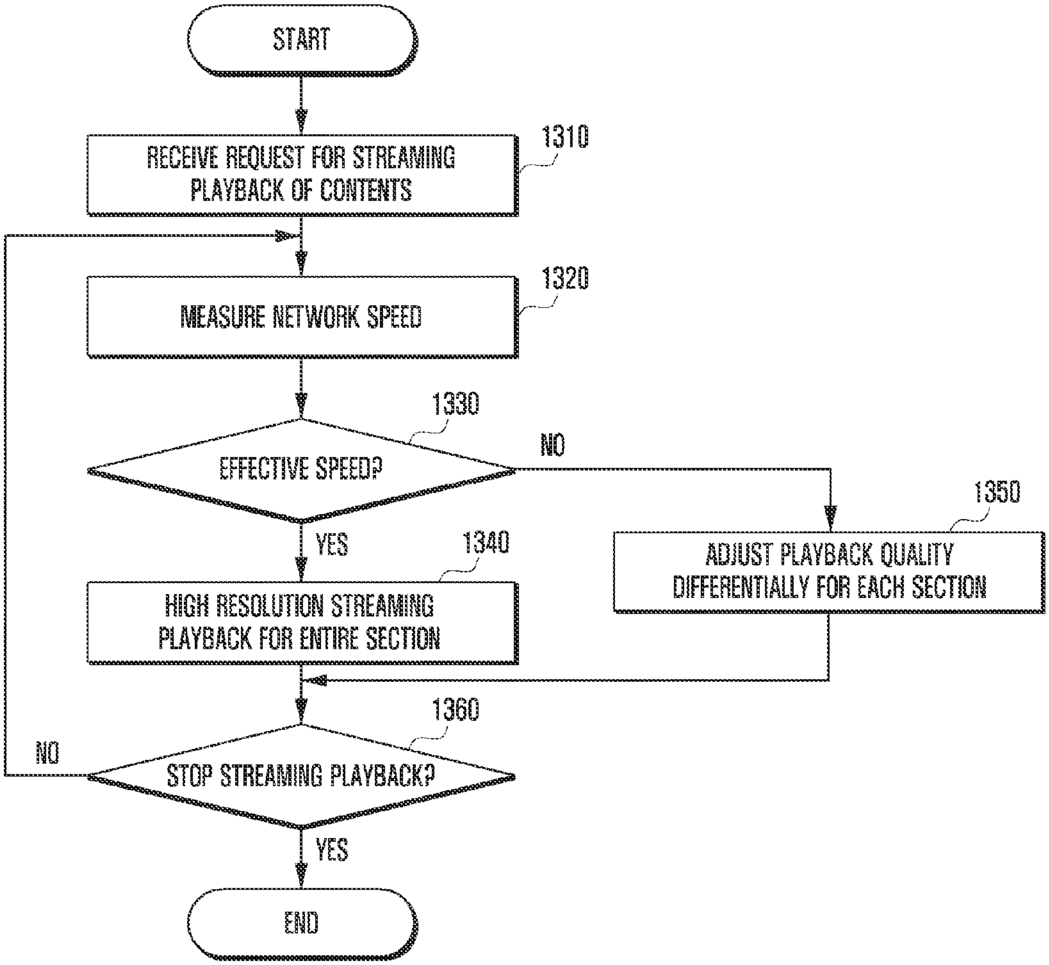
FIG. 13 is a flowchart illustrating a method of playing contents back according to an embodiment of the present disclosure.

FIG. 13 is a flowchart illustrating a method of playing contents back according to an embodiment of the present disclosure.

The AP 310 receives a request for a streaming playback of contents from other devices at operation 1310. Responding to the request, the AP 310 measures a network speed at operation 1320. The AP 310 identifies whether the measured network speed is effective for the streaming playback of contents requested at operation 1330. If the measured network speed is effective (for example, network speed>bit transmission rate of requested contents playback in the highest quality), the AP 310 operates the streaming playback in a high resolution for all the sections of the contents by synchronizing with the communication module 320 (for example, cellular module 321) and display unit 360 at operation 1340. If the measured network speed is ineffective (for example, network speed<bit transmission rate), the AP 310 adjusts the playback quality of contents differentially for each section by synchronizing with the cellular module 321 and display unit 360 at operation 1350. For example, the AP 310 can operate the streaming playback of non-preferential sections in a low resolution and the streaming playback of preferential sections in a high resolution. The AP 310 can determine termination of the streaming playback at operation 1360. If the streaming playback is not finished, the process returns to operation 1320. If the streaming playback is finished, the process ends.

Figure 14:
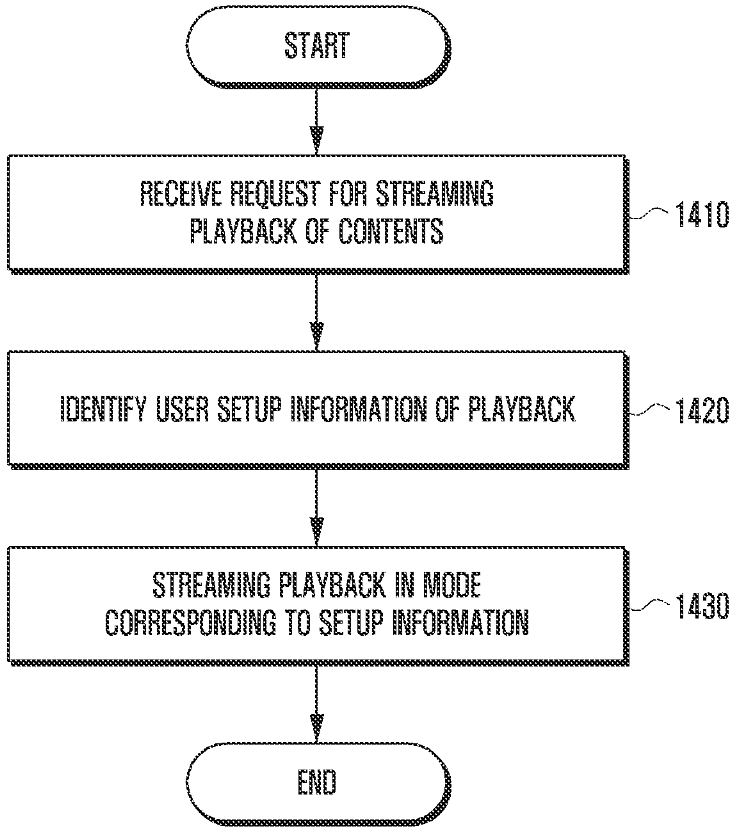
FIG. 14 is a flowchart illustrating a method of playing contents back according to an embodiment of the present disclosure.

FIG. 14 is a flowchart illustrating a method of playing contents back according to an embodiment of the present disclosure.

The AP 310 receives a request for a streaming playback of contents from other devices at operation 1410. Responding to the request, the AP 310 identifies setup information set by a user related to the playback at operation 1420. The AP 310 operates the streaming playback in a playback mode corresponding to the identified setup information (for example, a basic mode, data saving mode, time saving mode, or automatic mode) at operation 1430.

Figure 15:
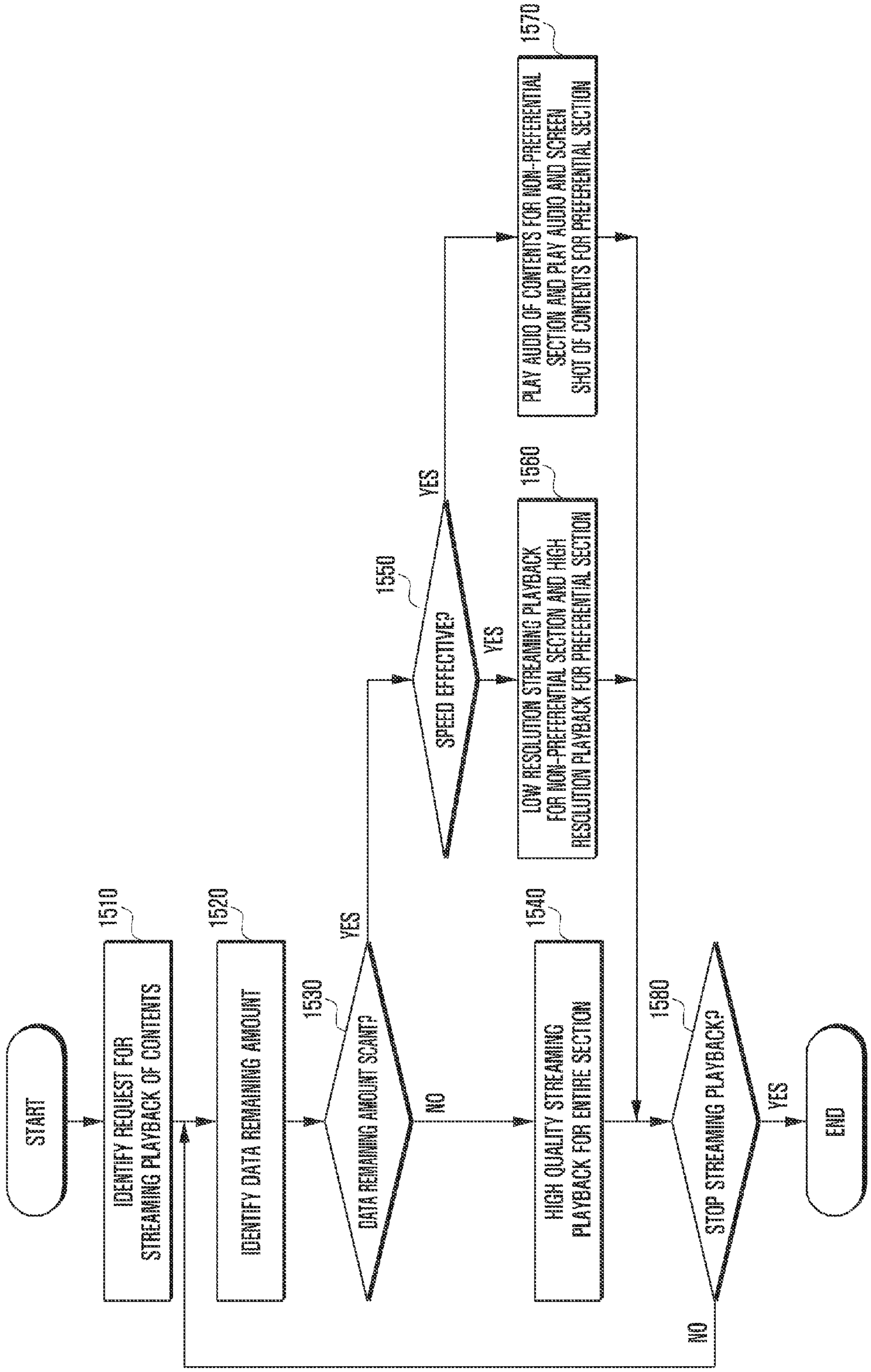
FIG. 15 is a flowchart illustrating a method of playing contents back according to an embodiment of the present disclosure.

FIG. 15 is a flowchart illustrating a method of playing contents back according to an embodiment of the present disclosure.

The AP 310 receives a request for a streaming playback of contents from other devices at operation 1510. Responding to the request, the AP 310 identifies a data remaining amount at operation 1520. The AP 310 identifies whether the data remaining amount is sufficient at operation 1530. If the data remaining amount is sufficient (for example, data remaining amount>threshold value D-th1), the AP 310 operates the streaming playback in a high resolution for all the sections of the contents by synchronizing with the communication module 320 (for example, cellular module 321) and display unit 360 at operation 1540. If the data remaining amount is insufficient (for example, data remaining amount<threshold value D-th1), the AP 310 identifies whether the data remaining amount is exhausted at operation 1550. If the data remaining amount is not exhausted (for example, data remaining amount>threshold value D-th2 (D-th2<D-th1)), the AP 310 operate the streaming playback of non-preferential sections in a low resolution and the streaming playback of preferential sections in a high resolution at operation 1560. If the data remaining amount is exhausted (for example, data remaining amount<threshold value D-th2), the AP 310 operates an audio playback for non-preferential sections of the contents, and operates an audio and screen shot playback for preferential sections of the contents at operation 1570. The AP 310 determines termination of the streaming playback at operation 1580. If the streaming playback is not finished, the process returns to operation 1520. If the streaming playback is finished, the process ends.

Figure 16:
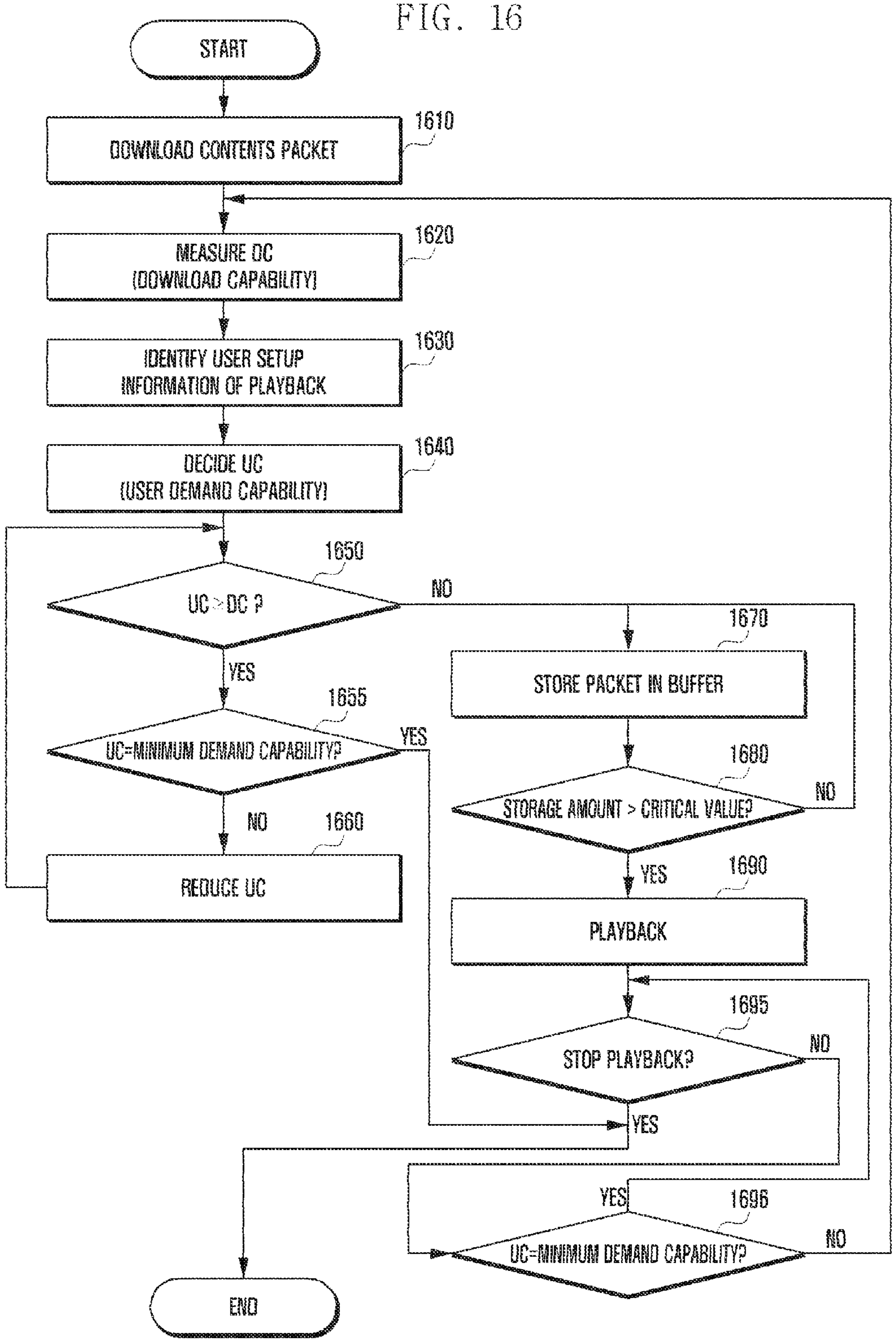
FIG. 16 is a flowchart illustrating a method of playing contents back according to an embodiment of the present disclosure.

FIG. 16 is a flowchart illustrating a method of playing contents back according to an embodiment of the present disclosure.

The AP 310 controls the communication module 320 to download packets of contents from an external device (for example, server 106) and to download packets of major section first at operation 1610.

The AP 310 measures a DC (Download Capacity) in bps at operation 1620.

The AP 310 identifies setup information set by a user related to a playback by accessing to the memory 330 at operation 1630. According to an embodiment of the present disclosure, the setup information may include a screen shot/voice mode, low resolution mode, high resolution mode, or HD (High Definition) resolution.

The AP 310 determines a User demand Capability (UC) in bps based on the setup information at operation 1640.

The AP 310 identifies whether the DC satisfies the UC at operation 1650. If the DC doesn't satisfy the UC (for example, UC≥DC), the AP 310 identifies whether the determined UC is a minimum demand capability (for example, UC3 corresponding to a screenshot or an audio mode). If the determined UC is the minimum demand capability according to the identification result at operation 1655, the process can be ended.

If the determined UC is not the minimum demand capability according to the identification result at operation 1655, the AP 310 adjusts the UC to lower stage/level by one stage/level and returns to operation 1650 at operation 1660. For example, the UC determined in operation 1640 is UC0 which corresponds to "HD resolution mode" and if UC0<DC, the UC is determined as UC1 (for example, corresponding to high resolution mode) which is one stage/level lower.

If the DC satisfies the UC after identifying whether the DC satisfies the UC at operation 1650, the AP 310 stores the downloaded packets in a buffer (for example, frame buffer) at operation 1670.

The AP 310 identifies whether a packet amount stored in the buffer is greater than a threshold value (for example, 10% of storable amount in buffer) at operation 1680. In case of "stored amount<threshold value", the process returns to operation 1670.

In case of "stored amount<threshold value", the AP 310 operates a streaming playback based on the determined UC (for example, UC1 corresponding to the high resolution mode) at operation 1690. That is, the AP 310 operates a streaming playback based on the high resolution mode. The AP 310 determines termination of the streaming playback at operation 1695. If the streaming playback is not finished, the AP 310 determines whether the determined UC is a maximum demand capability (for example, UC0) at operation 1696. If the determined UC is not the maximum demand capability, the process returns to operation 1620. If the determined UC is the maximum demand capability, the process returns to operation 1695. If the streaming playback is finished, the process ends.

According to an embodiment of the present disclosure, a method for managing a playback of contents in an electronic device may include: recognizing a major section of the contents; obtaining at least one of setup information related to a network speed, data remaining amount, and playback, and playback time of the contents; and deciding a playback policy of the contents based on at least one of the recognized major section and obtained information. The deciding a playback policy may include at least one of: deciding the playback policy to a data saving mode at least based on the data remaining amount; deciding the playback policy to a time saving mode at least based on the playback time; deciding the playback policy to a quality adjustment mode at least based on the network speed; and deciding the playback policy from the data saving mode, time saving mode, and quality adjustment mode based on the setup information. The operation of deciding the playback policy to the data saving mode may include, if the data remaining amount is less than a predetermined threshold value, deciding the playback policy from one of: a skip mode for playing back by omitting a non-major section and downloading the major section from the contents, a quality adjustment mode for playing back by downloading a non-major section in a low quality and downloading the major section in a high quality, a multiple speed mode for playing back by downloading partial image frames from the contents, and a voice mode for playing back by sequentially displaying partial image frames of the contents and downloading voice data from the contents. The operation of deciding the playback policy to the time saving mode may include, if the playback time is less than a predetermined threshold value, deciding the playback policy from one of: a skip mode for playing back by omitting a non-major section and downloading the major section from the contents, a priority mode for playing back by preferentially downloading the major section from the contents prior to the non-major section, and a multiple speed mode for playing back by downloading partial image frames from the contents. The operation of deciding the playback policy to the quality adjustment mode may include, if the network speed is less than a predetermined threshold value, deciding the playback policy to a quality adjustment for playing back by downloading a non-major section in a low quality and downloading the major section in a high quality from the contents. The operation of recognizing a major section may include: receiving information related to the contents from an external device, and recognizing the major section based on the received information. The received information may include statistical information related to the contents. The operation of recognizing a major section may include recognizing the major section based on the statistical information and user information stored in the electronic device.

The term "module" used in various embodiments of the present disclosure may mean a unit including at least one of hardware, software, and firmware. For example, the "module" may be interchangeably used by substituting with a unit, logic, logical block, component, or circuit. The "module" may be a minimum unit configured in a body or a portion of the body. The "module" may be a minimum unit performing at least one function or a portion of the unit. The "module" can be implemented mechanically or electronically. For example, the "module" according to various embodiments of the present disclosure may include at least one of an Application-Specific IC (ASIC) chip, Field-Programmable Gate Arrays (FPGAs), and programmable-logic device which are already known or to be developed and performing specific operations.

According to various embodiments of the present disclosure, at least some of the devices (for example, modules or functions thereof) or the method (for example, operations) according to the present disclosure may be implemented by a command stored in a computer-readable storage medium in a programming module form. When the command is executed by one or more processors, the one or more processors may perform a function corresponding to the command. The computer-readable storage medium may be, for example, the memory. At least some of the programming modules may be implemented (for example, executed) by, for example, the processor. At least a part of the programming module may include, for example, a module, a program, a routine, a set of instructions and/or a process for performing one or more functions.

The computer readable recording medium may include magnetic media such as a hard disc, a floppy disc, and a magnetic tape, optical media such as a compact disc ROM (CD-ROM) and a DVD, magneto-optical media such as a floptical disk, and hardware devices specifically configured to store and execute program commands, such as a ROM, a RAM, and a flash memory. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

A method and an apparatus according to various embodiments of the present disclosure can preferentially play a major section of contents. Further, the method and apparatus according to various embodiments of the present disclosure can efficiently play contents back in terms of cost and time.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for managing a playback of contents in an electronic device, the method comprising:

receiving a request for the playback of the contents;

receiving statistical information related to a major section of the contents from an external device in response to the request for the playback of the contents;

recognizing the major section of the contents based on the received statistical information;

identifying a data remaining amount responding to the request;

playing the major section of the contents by streaming a non-major section in a low resolution and streaming a major section in a high resolution, if the data remaining amount is less than a first threshold value and greater than a second threshold value; and playing the major section of the contents by downloading and sequentially displaying partial image frames from the contents, and by downloading voice data from the contents, if the data remaining amount is less than the second threshold value, wherein the major section comprises a specified section related to appearance of a major person, an object, or an event and is set by a user.

2. The method of claim 1, further comprising determining a playback policy to a quality adjustment for playing back by downloading a non-major section in a low resolution and downloading the major section in a high resolution from the contents if the data remaining amount is less than the first threshold value and greater than the second threshold value.

3. The method of claim 1, further comprising: determining a playback policy to a quality adjustment for playing back by downloading and sequentially displaying partial image frames from the contents, and downloading voice data from the contents if the data remaining amount is less than the second threshold value.

4. The method of claim 1, further comprising: measuring a network speed responding to the request; and playing the major section of the contents by streaming a non-major section in a low resolution and streaming a major section in a high resolution, if the measured network speed is less than a predetermined threshold value.

5. The method of claim 1, further comprising determining a playback policy to a quality adjustment for playing back by downloading a non-major section in a low resolution and downloading the major section in a high resolution from the contents if the measured network speed is less than the predetermined threshold value.

* * * * *